US010698575B2

(12) United States Patent
Walkin et al.

(10) Patent No.: US 10,698,575 B2
(45) Date of Patent: Jun. 30, 2020

(54) COMMUNICATION USER INTERFACE SYSTEMS AND METHODS

(71) Applicant: Facebook, Inc., Menlo Park, CA (US)

(72) Inventors: Brandon Marshall Walkin, San Francisco, CA (US); Michael James Matas, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 58 days.

(21) Appl. No.: 16/155,620

(22) Filed: Oct. 9, 2018

(65) Prior Publication Data

US 2019/0056843 A1 Feb. 21, 2019

Related U.S. Application Data

(63) Continuation of application No. 15/001,044, filed on Jan. 19, 2016, now Pat. No. 10,095,385, which is a
(Continued)

(51) Int. Cl.
*G06Q 10/10* (2012.01)
*G06F 3/0482* (2013.01)
(Continued)

(52) U.S. Cl.
CPC .......... *G06F 3/0482* (2013.01); *G06F 3/0485* (2013.01); *G06F 3/0486* (2013.01);
(Continued)

(58) Field of Classification Search
CPC .................................................... G06Q 10/10
(Continued)

(56) References Cited

U.S. PATENT DOCUMENTS 2,011 A * 3/1841 Wemmer ............ B23D 63/162
76/36
14,092 A * 1/1856 Cumings .................. E02B 7/42
405/100
(Continued)

FOREIGN PATENT DOCUMENTS

CN 105793809 A 7/2016
EP 1653398 5/2006
(Continued)

OTHER PUBLICATIONS

Extended European Search Report as received in EP 18201224.5 dated Nov. 28, 2018.
(Continued)

*Primary Examiner* — Reza Nabi
(74) *Attorney, Agent, or Firm* — Keller Jolley Preece

(57) ABSTRACT

The principles described herein provide methods and systems of providing a user interface to allow a user to compose and send an electronic communication quickly and conveniently. For example, a user interface includes split-pane interface having a navigable tray area and a composition area. The navigable tray area may include categories of trays, each tray including a navigable listing of content items that may form part of the electronic communication. The navigable tray area allows the user to navigate from one tray to the next to access different types of content items to be used in composing the electronic communication. When composing an electronic communication, a user can select an item in a tray, and the item is previewed in the composition area and can become part of the electronic communication.

20 Claims, 22 Drawing Sheets

Related U.S. Application Data continuation of application No. 14/092,736, filed on Nov. 27, 2013, now Pat. No. 9,246,961.

(51) Int. Cl.
| | |
|---|---|
| *H04L 29/06* | (2006.01) |
| *G06F 3/0488* | (2013.01) |
| *G06F 3/0486* | (2013.01) |
| *G06F 3/0485* | (2013.01) |
| *G06F 40/106* | (2020.01) |
| *G06F 40/166* | (2020.01) |
| *G06Q 10/00* | (2012.01) |
| *G06F 3/0484* | (2013.01) |
| *H04L 12/58* | (2006.01) |
| *H04L 29/08* | (2006.01) |

(52) U.S. Cl.
CPC ........ *G06F 3/0488* (2013.01); *G06F 3/04842* (2013.01); *G06F 3/04883* (2013.01); *G06F 3/04886* (2013.01); *G06F 40/106* (2020.01); *G06F 40/166* (2020.01); *G06Q 10/00* (2013.01); *G06Q 10/107* (2013.01); *H04L 51/22* (2013.01); *H04L 65/403* (2013.01); *H04L 67/12* (2013.01)

(58) Field of Classification Search
USPC .......................................................... 715/753
See application file for complete search history.

(56) References Cited

U.S. PATENT DOCUMENTS

| | | | | |
|---|---|---|---|---|
| 14,312 | A * | 2/1856 | Gold | F24D 19/081 236/64 |
| 5,477,264 | A * | 12/1995 | Sarbadhikari | G06F 8/65 348/231.6 |
| 8,738,705 | B2 * | 5/2014 | Kelmenson | G06Q 50/01 709/205 |
| 9,246,961 | B2 * | 1/2016 | Walkin | G06F 3/0488 |
| 9,836,207 | B2 | 12/2017 | Langholz et al. | |
| 10,095,385 | B2 | 10/2018 | Walkin et al. | |
| 2004/0019611 | A1 * | 1/2004 | Pearse | G06F 16/9566 |
| 2007/0136750 | A1 * | 6/2007 | Abanami | H04N 21/4316 725/44 |
| 2007/0258113 | A1 * | 11/2007 | Vau | H04N 1/3871 358/452 |
| 2008/0288338 | A1 * | 11/2008 | Wiseman | G06Q 30/02 705/14.69 |
| 2009/0070820 | A1 * | 3/2009 | Li | G06Q 20/12 725/62 |
| 2010/0050086 | A1 * | 2/2010 | Sherrard | H04M 1/72563 715/739 |
| 2010/0124906 | A1 * | 5/2010 | Hautala | G06Q 10/10 455/412.1 |
| 2010/0169772 | A1 | 7/2010 | Stallings et al. | |
| 2010/0234077 | A1 * | 9/2010 | Yoo | G06F 1/1626 455/566 |
| 2010/0262924 | A1 * | 10/2010 | Kalu | H04L 51/04 715/753 |
| 2011/0069196 | A1 * | 3/2011 | Jung | H04N 1/00137 348/222.1 |
| 2011/0081952 | A1 * | 4/2011 | Song | H04N 1/00307 455/566 |
| 2011/0086647 | A1 * | 4/2011 | Riddle | G06Q 10/10 455/466 |
| 2011/0119619 | A1 * | 5/2011 | Fong | H04N 5/23216 715/784 |
| 2011/0163971 | A1 * | 7/2011 | Wagner | G06F 3/04817 345/173 |
| 2011/0246502 | A1 * | 10/2011 | Aguera Y Arcas | G06F 16/43 707/769 |
| 2011/0276904 | A1 * | 11/2011 | Mehin | H04L 12/1827 715/758 |
| 2011/0319131 | A1 * | 12/2011 | An | H04N 1/00307 455/556.1 |
| 2012/0023436 | A1 * | 1/2012 | Brown | G06F 3/0488 715/780 |
| 2012/0110064 | A1 | 5/2012 | Chen et al. | |
| 2012/0124483 | A1 * | 5/2012 | Zuckerberg | H04L 51/36 715/752 |
| 2012/0190388 | A1 * | 7/2012 | Castleman | H04L 51/04 455/466 |
| 2013/0072221 | A1 * | 3/2013 | Chen | H04W 4/14 455/456.1 |
| 2013/0083215 | A1 * | 4/2013 | Wisniewski | H04N 5/23222 348/222.1 |
| 2013/0093833 | A1 * | 4/2013 | Al-Asaaed | G06F 3/04886 348/14.02 |
| 2013/0117378 | A1 * | 5/2013 | Kotorov | G06Q 30/0241 709/205 |
| 2013/0227455 | A1 * | 8/2013 | Lee | G06F 3/04883 715/769 |
| 2013/0246138 | A1 * | 9/2013 | Johnson | G06Q 30/02 705/14.16 |
| 2013/0275525 | A1 * | 10/2013 | Molina | H04L 51/12 709/206 |
| 2013/0326384 | A1 * | 12/2013 | Moore | G01C 21/3638 715/771 |
| 2014/0040764 | A1 * | 2/2014 | Stoop | G06F 3/04842 715/748 |
| 2014/0085487 | A1 * | 3/2014 | Park | H04N 5/23216 348/207.1 |
| 2015/0052484 | A1 * | 2/2015 | Huang | G06F 3/04842 715/825 |
| 2015/0058754 | A1 * | 2/2015 | Rauh | G06F 3/0482 715/753 |
| 2015/0149927 | A1 * | 5/2015 | Walkin | H04L 51/10 715/752 |
| 2015/0154676 | A1 * | 6/2015 | Matousek | G06F 3/0488 705/26.5 |
| 2015/0178968 | A1 * | 6/2015 | Salmi | H04W 4/21 345/634 |
| 2015/0206349 | A1 * | 7/2015 | Rosenthal | H04N 21/41407 345/633 |
| 2015/0312184 | A1 * | 10/2015 | Langholz | H04L 51/04 715/753 |
| 2018/0081518 | A1 * | 3/2018 | Langholz | H04L 51/04 |

FOREIGN PATENT DOCUMENTS

| | | |
|---|---|---|
| EP | 2654274 A1 | 10/2013 |
| EP | 2879086 | 6/2015 |
| JP | H11308434 | 11/1999 |
| KR | 2012-0023405 A | 3/2012 |
| KR | 2013-0049416 A | 5/2013 |
| KR | 2013-0112040 A | 10/2013 |
| WO | WO 2015/080744 | 6/2015 |

OTHER PUBLICATIONS

Office Action as received in Chinese application 2013800812328 dated Oct. 23, 2018.

Emi Aoki, "How to use smartphone efficiently for improving your job skill and life—by purpose (1)," Nikkei Pasokon, Japan, Nikkei Business Publications, Inc., (Jun. 11, 2012), vol. 651, p. 89-92. No English translation available.

Emi Aoki, "Staple SNSs—Easy and convenient techniques to use them," Nikkei Pasokon, Japan, Nikkei Business Publications, Inc., (Sep. 23, 2013), vol. 682, p. 87-90. No English translation available.

Extended European Search Report as received in EP14171709 dated Feb. 9, 2015.

International Search Report as received in PCT/US2013/072415 dated Aug. 25, 2014.

Spector, Lincoln, Your complete guide to the Android camera, Jan. 2, 2013, 13 pages, available at http://www.techhive.comiarticle/2021321/your-complete-guide-to theandroid-camera.html?page=2.

(56) References Cited

OTHER PUBLICATIONS

UXarchive.com, Snapchat, Snapchat user flow description from http://www.uxarchive.com/apps/snapchat, WaybackMachine capture from Oct. 23, 2012.
Office Action as received in Japanese application 2016-534673 dated Oct. 10, 2017.
Office Action as received in Japanese application 2016-534673 dated Apr. 3, 2018.
U.S. Appl. No. 61/868,960 "Scrollable In-Line Camera for Capturing and Sharing Content," filed Aug. 22, 2013.
Summons to attend oral proceedings in European Application 14 171709.0 dated Feb. 8, 2018.
Tomoko Suzuki, "Section 46 Let's share photos using Facebook camera," "Basics and convenient techniques for active use of smartphone—Easy guide to start-mini-," Japan, Gijutsu-Hyohron Co., Ltd., Dec. 15, 2012, First Ed., p. 154-157. (a reference indicating well-known art). No English translation available.
U.S. Appl. No. 14/092,716, dated Sep. 1, 2015, Office Action.
U.S. Appl. No. 14/092,716, dated Mar. 9, 2016, Office Action.
U.S. Appl. No. 14/092,716, dated Sep. 9, 2016, Office Action.
U.S. Appl. No. 14/092,716, dated Feb. 10, 2017, Office Action.
U.S. Appl. No. 14/092,716, dated Sep. 15, 2017, Office Action.
U.S. Appl. No. 14/092,716, dated Jan. 24, 2018, Office Action.
U.S. Appl. No. 14/092,736, dated Sep. 17, 2015, Notice of Allowance.
U.S. Appl. No. 15/001,044, dated May 22, 2018, Notice of Allowance.
U.S. Appl. No. 14/312,481, dated Mar. 29, 2016, Office Action.
U.S. Appl. No. 14/312,481, dated Aug. 3, 2016, Office Action.
U.S. Appl. No. 14/312,481, dated Nov. 22, 2016, Office Action.
U.S. Appl. No. 14/312,481, dated May 12, 2017, Office Action.
U.S. Appl. No. 14/312,481, dated Sep. 7, 2017, Notice of Allowance.
Office Action as received in Korean Application 10-2016-7013449 dated Nov. 25, 2019.
U.S. Appl. No. 15/826,032, dated Dec. 16, 2019, Office Action.
Office Action as received in Mexican application MXa2016006508 dated Jun. 4, 2019.

\* cited by examiner

COMMUNICATION USER INTERFACE SYSTEMS AND METHODS

CROSS REFERENCE TO RELATED APPLICATIONS

The present application is a continuation of U.S. application Ser. No. 15/001,044 filed Jan. 19, 2016, which is a continuation of U.S. application Ser. No. 14/092,736 filed Nov. 27, 2013, now issued as U.S. Pat. No. 9,246,961. The aforementioned application(s) and patent(s) are hereby incorporated by reference in their entirety.

BACKGROUND OF THE INVENTION

1. The Field of the Invention

One or more embodiments of the present invention relate generally to systems and methods for providing a user interface. More specifically, one or more embodiments of the present invention relate to systems and methods of providing a user interface used in connection with composing and sending an electronic communication.

2. Background and Relevant Art

Electronic or computing devices, including mobile devices (e.g., smart phones, tablets), have created numerous ways for people to connect and communicate with one another. For example, a user can send an electronic communication to one or more other users, or post an electronic message within an online forum. An electronic communication may include text, images, video, and/or other data.

User interfaces (e.g., graphical user interfaces or "GUIs") facilitate interaction between a user and a computing device. In particular, a user interface provides a user the ability to control the operations of the machine through user input. Based on user input through a user interface, the machine provides output (e.g., through program output).

A number of disadvantages exist with respect to traditional user interfaces used in connection with composing and sending electronic communications. For example, some traditional user interfaces are inefficient in allowing users to include photos, video, location information, tags, and/or other data in an electronic communication. Moreover, traditional user interfaces do not provide a convenient way for a user to preview the contents of an electronic message (e.g., photos) prior to sending the electronic message. Therefore, the process of composing and sending an electronic communication can be both time-consuming and frustrating for a user.

Accordingly, there are a number of considerations to be made in improving user interfaces used in connection with composing and sending electronic communications.

BRIEF SUMMARY OF THE INVENTION

Embodiments of the present invention provide benefits and/or solve one or more of the foregoing or other problems in the art with methods and systems for providing a user interface for composing and sending electronic communications. For example, the principles described herein provide methods and systems of providing a user interface to allow a user to compose and send an electronic communication quickly and conveniently. In particular example embodiments, a user interface includes split-pane interface having a navigable tray area and a composition area. The navigable tray area may include categories of trays, each tray including a navigable listing of a category of items that may form part of the electronic communication. The navigable tray area allows the user to navigate from one tray to the next to access different types of items to be used in composing the electronic communication. When composing an electronic communication, a user can select an item in a tray, and a preview of the item is presented in the composition area.

In addition, example embodiments of the present invention can provide a user interface that allows a user to easily compose an electronic communication that includes text and a photograph taken with a camera located on the device with which a user composes an electronic communication. For example, the user can enter text into the composition area that is meant to accompany a photograph. After entering the text, the user can select a camera option. After selecting the camera option, the camera viewfinder window is activated and the text the user entered is overlaid on the active viewfinder window. Following the user capturing the photograph, the text is associated with the photograph. The user can then send the associated text and photograph in an electronic communication.

In one example embodiment, the user interface disclosed herein is configured for use with a social-networking system. In particular, the user interface disclosed herein may facilitate the creation and/or sending (e.g., posting) of one or more communications by way of the social-networking system.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1:
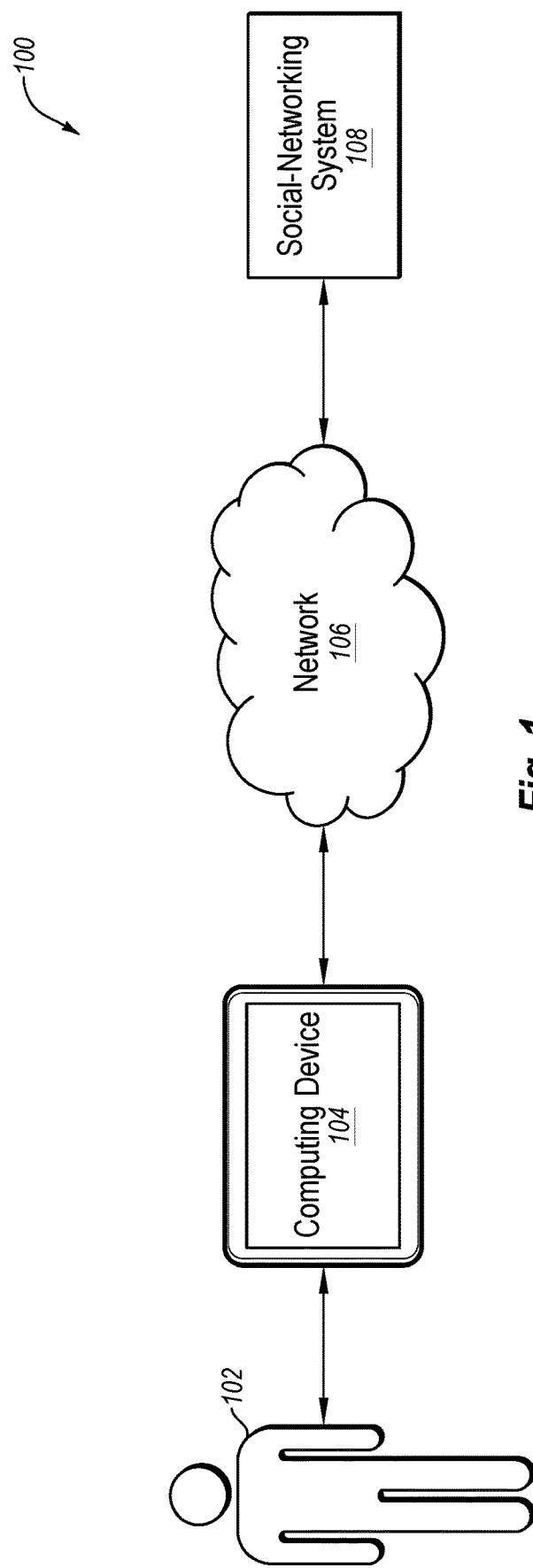
FIG. 1 illustrates an example environment in which the methods and system for providing a user interface may be implemented.

Embodiments of the present invention provide benefits and/or solve one or more of the foregoing or other problems in the art for providing a user interface for composing and sending electronic communications. In particular, example implementations of the present invention provide an electronic communication user interface that is configured to allow a user to easily access items to be included in an electronic communication. For example, an electronic communication user interface may include a split-pane interface having a tray area and a composition area. The tray area organizes items that may be included in an electronic communication within navigable trays that provide a user with easy access to the items (e.g., images) while composing the electronic communication. A user can easily select items to be included in an electronic message by interacting with one or more items within the navigable trays. The composition area shows a preview of items and/or other content that the user has selected or provided for inclusion in an electronic message.

In addition to easily allowing a user to select items to be included in an electronic communication, example implementations of an electronic communication user interface efficiently allow users to select one or more contacts or locations to include (e.g., "tag") in an electronic communication. For example, a user's contacts (e.g., friends) may be listed in a navigable tray. A user may easily select one or more contacts or groups of contacts easily at any point while composing an electronic communication by navigating to the contacts tray and selecting one or more contacts to tag in an electronic communication. Similarly, based on a detected location of the user, one or more locations or points of interest (e.g., restaurants or parks) may be listed in a navigable tray. The user can select one or more of the listed locations to tag in the electronic communication.

Moreover, example implementations of an electronic communication user interface provide users the ability to preview an electronic communication prior to sending the electronic communication. For example, an electronic communication user interface can provide the user with a preview display of contacts, text, image(s), location information, and/or other data included in an electronic communication. In addition, example implementations of an electronic communication provide unique and intuitive interfaces to capture a photograph, and combine other items with the captured photograph, so that a user can preview both the about to be captured photograph and other electronic communication content simultaneously while composing an electronic communication. The above, as well as additional features and benefits of an electronic communication user interface, will be described below in more detail.

Example implementations of an electronic communication user interface may be used to compose or create one or more types of electronic communication. For example, an electronic communication can be one of several types of electronic communication, including posts through a social-networking system, blog posts, posts to a website, instant messages, picture messages, video messages, text messages or any other type of electronic communication that facilitates the communication of electronic data from one user to another user. For purposes of this application, reference is often made to a social-network post composed by a user and sent through a social-networking system. It is understood, however, that the electronic communication user interface disclosed herein can be used in a similar fashion with all types of electronic communication.

A social-network post can include various types of information. For example, a social-network post can include text, contacts, images (e.g., photographs), videos, location information, and/or additional data information. To illustrate, a user can compose a social-network post that includes a text portion with an accompanying photograph and location information of where the photograph was taken, where the user is located, and/or who the user is with. Thus, a user of a social-networking system can efficiently communicate, in one post, a variety of information FIG. 1 illustrates an exemplary system 100, within which exemplary embodiments of an electronic communication user interface (or "user interface") may be implemented. System 100 may include a user 102, a computing device 104, a network 106, and a social-networking system 108. The computing device 104, the network 106 and the social-networking system 108 may be communicatively coupled, as illustrated in FIG. 1. Although FIG. 1 illustrates a particular arrangement of the user 102, the computing device 104, the network 106, and the social-networking system 108, various additional arrangements are possible. For example, the computing device 104 may directly communicate with the social-networking system 108, bypassing network 106.

The computing device 104 and social-networking system 108 may communicate using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, in-band and out-of-band signaling technologies, and other suitable communications networks and technologies.

In certain embodiments, computing device 104 and social-networking system 108 may communicate via a network 106, which may include one or more networks, including, but not limited to, wireless networks (Wi-Fi networks), (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between computing device 104 and social-networking system 108. Communications between computing device 104 and social-networking system 108 may be transported using any one of the above-listed networks, or any combination or sub-combination of the above-listed networks. While FIG. 1 shows computing device 104 and social-networking system 108 communicatively coupled via network 106, it will be recognized that computing device 104 and social-networking system 108 may be configured to communicate one with another in any other suitable manner (e.g., via a direct connection).

As illustrated in FIG. 1, system 100 can include the user 102. For example, the user 102 may be an individual (i.e., human user). Although FIG. 1 illustrates only one user 102, it is understood that system 100 can include a plurality of users, with each of the plurality of users interacting with the social-networking system 108 through a corresponding plurality of computing devices. For example, the user 102 can interact with the computing device 104 for the purpose of composing and sending an electronic communication (e.g., social-network post). The user 102 may interact with the computing device 104 by way of a user interface on the computing device 104. For example, the user 102 can utilize the user interface to cause the computing device to create and send a customized electronic communication for delivery to one or more of the plurality of users of the social-networking system 108.

Social-networking system 108 may generate, store, receive, and transmit social-networking data, such as social-network posts or messages sent by the user 102. For example, social-networking system 108 may receive an electronic communication from the computing device 104 in the form of a social-network post. Upon receiving the social-network post, the social-networking system 108 can send the social-network post to one or more of the plurality of computing devices used by a corresponding plurality of users of the social-networking system 108 (e.g., "friends" of user 102). In addition, social-networking system 108 can facilitate various other forms of electronic communication between users of the social-networking system 108.

Figure 2:
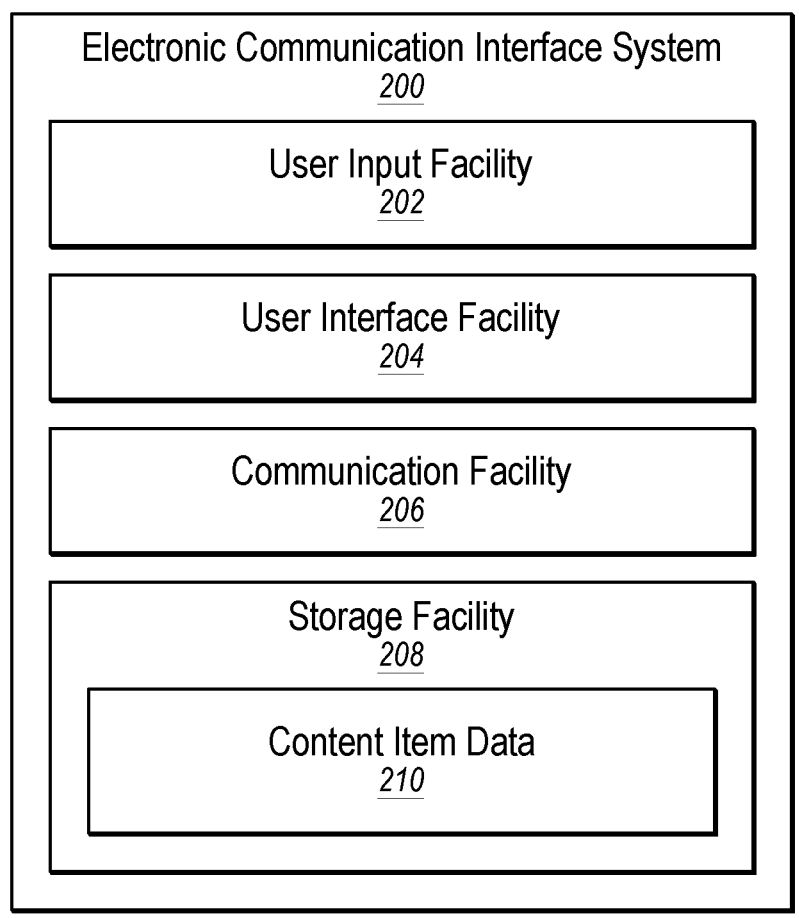
FIG. 2 illustrates an exemplary electronic communication user interface system according to principles described herein.

FIG. 2 illustrates an exemplary electronic communication user interface system 200 (or simply "system 200"). As shown, system 200 may include, but is not limited to, a user input facility 202, a user interface facility 204, a communication facility 206, and a storage facility 208, each of which may be in communication with one another using any suitable communication technologies. It will be recognized that although facilities 202-208 are shown to be separate in FIG. 2, any of facilities 102-108 may be combined into fewer facilities, such as into a single facility, or divided into more facilities as may serve a particular embodiment.

As will be explained in more detail below, system 200 includes a user input facility 202. User input facility 202 may be configured to detect, receive, and/or facilitate user input in any suitable manner. In some examples, user input facility 202 may be configured to detect one or more user interactions with a user interface. For example, user input facility 202 may be configured to detect one or more touch gestures (e.g., swipe gestures, tap gestures, pinch gestures, or reverse pinch gestures) provided by a user by way of a touch screen. In some examples, the detected touch gestures may be provided in relation to and/or directed at one or more elements of a user interface presented on the touch screen.

User input facility 202 may be additionally or alternatively configured to receive data representative of user input. For example, user input facility 202 may receive one or more user configurable parameters from a user, one or more user commands from the user, and/or any other suitable user input.

User input and other data received by user input facility 202 may be utilized by system 200 to manage, control, and/or facilitate navigation of a user interface. For example, in response to one or more touch gestures detected by user input facility 202, system 200 may allow a user to access one or more items to be used in composing an electronic communication. In response to one or more touch gestures detected by user input facility 202, system 200 may allow a user to view a list of contacts (e.g., social-networking contacts or "friends), a list of photos, or a list of locations (e.g., points of interest near the user). Additionally or alternatively, one or more user inputs received by input facility 202 may be utilized by system 200 to allow a user to compose the content of an electronic communication. For example, in response to one or more touch gestures detected by user input facility 202, system 200 may allow a user to add a contact as part of an electronic communication, input text, images, location information, or select other content items to be included in an electronic communication, as will further be described below.

As mentioned above, system 200 can further include the user interface facility 204 as illustrated in FIG. 2. The user interface facility 202 may be configured to provide, manage, and/or control a user interface that allows a user to compose an electronic communication. For example, a user interface may be configured to facilitate composition of an electronic communication, such as a social-network post. In some examples, user interface facility 204 may present to a user a user interface by way of a touch screen to facilitate user interaction with the user interface.

To illustrate, user interface facility 204 may be configured to facilitate the selection of content items to be used in composing a social-network post. As used herein, "content items," "items," or "content" refers generally to any data or information used for the purpose of composing and sending an electronic communication. The terms "content item," "item," and "content" will be used herein to generally describe user contacts, text, images, locations, and any other data that can be used in association with composing and sending an electronic communication. For example, the user interface facility 204 may facilitate the selection of content items for the purposes of selecting contacts to tag in the electronic communication, inputting text to be included in the electronic communication, selecting an image to be included in the electronic communication, capturing a photograph to be included in the electronic communication, and choosing a location to tag in the electronic communication.

As briefly mentioned above, user interface facility 204 can be configured to facilitate the selection of one or more contacts as one type of content item used to compose an electronic communication. For example, user interface facility 204 can provide a user interface that allows a user to select one or more contacts, or one or more groups of contacts, to tag in an electronic communication. Alternatively, or in addition, user interface facility 204 can provide a user interface that allows a user to select one or more contacts, or one or more groups of contacts, to receive an electronic communication. To illustrate, the user interface facility 204 can provide a user interface that presents a contact list. The user can browse the contact list, search the contact list, and select an individual contact or group of contacts from the contact list by way of the user interface using one or more touch gestures that can be detected by the user input facility 202.

The list of contacts can be generated in a variety of methods. For example, a contact list may include a user's "friends" or "connections" associated with the user within a social-networking system. Alternatively, or in addition, a user can manually enter contact information to the contact list through the user interface. Moreover, a user can import contacts from various sources, including email, instant messages, text messages, telephone call logs, and other similar sources. The contact list can be maintained on the system 200. Alternatively, or in addition, the contact list can be maintained on a social-networking system and accessed by the system 200.

In addition to facilitating the browsing, searching and selecting of contacts from a contact list, the user interface facility 204 can facilitate the input of text data to be included in an electronic communication. For example, the user interface facility 204 can provide a user interface that includes a keyboard interface. A user can interact with the keyboard interface using one or more touch gestures to select text to be included in an electronic communication. For example, a user can use the keyboard interface to enter a message to accompany and/or describe one or more other content items in an electronic communication. In addition to text, the user interface, including the keyboard interface, can facilitate the input of various other characters, symbols, icons, or other character information.

The user interface facility 204 can also facilitate browsing, searching and selecting an image to include as part of an electronic communication. As used herein, the term "image" refers to any digital multimedia that when rendered by a computing device presents a visual presentation. For example, image may include, but is not limited to, digital image files, digital photographs, digital animations, or digital videos.

The user interface facility 204 can facilitate the browsing, searching and selecting of one or more images by providing a user interface that presents a navigable list of images. For example, the user interface can include elements (e.g., thumbnail images) that correspond to images, as will be discussed further below. The user can browse the image list, search the image list, and select one or more images by way of the user interface using one or more touch gestures that can be detected by the user input facility 202, as will be explained further below.

The images may or may not be maintained by the system 200. For example, in one implementation the list of images and the image files themselves can be maintained by the system 200. Thus, when a user interacts with the list of images through a user interface, for example, by selecting an image, the user interface facility 204 retrieves the selected image from the system 200 (e.g., from storage facility 208) to include as part of an electronic communication. Alternatively, upon a user selecting an image from the list of images, the user interface facility 204 can retrieve the image from a source outside the system 200. For example, the image may be maintained and retrieved from a social-networking system, a cloud-based server, or any other source outside the system 200.

In addition to selecting an existing image to include in an electronic communication, the user interface facility 204 can facilitate capturing an image to be included in an electronic communication. For example, the user interface facility 204 can provide a user interface that includes a digital camera interface. The digital camera interface allows a user to capture a photograph to be included in an electronic communication. In a similar fashion, a video can be captured and included in an electronic communication.

As will be explained in further detail below, user interface facility 204 can facilitate a display of one or more content items (e.g., text, contacts, location information) while using the digital camera interface. For example, the user interface facility 204 can provide a user interface having a camera viewfinder showing a scene to be captured by the digital camera. While providing the viewfinder display, the user interface can overlay one or more content items to include in an electronic communication with the target photograph to be captured. Upon the user interacting with the user interface to capture the photograph, the user interface facility 204 can associate the captured photograph with the one or more content items that were overlaid on the viewfinder display.

In addition to providing the user the ability to select images to include in an electronic communication, the user interface facility 204 can allow a user to browse location information, search location information, and/or selection location information. Location information, as referred to herein, means information that indicates geographic information. For example, location information may include, but is not limited to, names and addresses of a city, business, or other point of interest. Location information can further include digital renderings of a location on a map (e.g., grid map or satellite map), geographic coordinates, an image associated with a location, or any other information or content associated with location.

The user interface facility 204 can collect and maintain location information based on the user's travel. For example, the user interface facility 204 can include or be in communication with a global positioning system (GPS) that tracks the position of the computing device on which the system 200 is implemented. In particular, the user interface facility 204 can maintain a list of "places" that are nearby the computing device or that a user has visited based on a log associated with the GPS. In addition, the user interface facility 204 can provide a user interface that provides a user the ability to search locations maintained in the list of "places," or alternatively the user interface can search a source outside system 200 for location information.

In one example implementation, the user interface facility 204 can include a user interface that allows a user to select location information from a list of location information. For example, the user interface facility 204 can provide a user interface that allows a user to browse, search, and select location information. To illustrate, the user can browse location information (e.g., a places list), search location information, and select location information by way of the user interface using one or more touch gestures that can be detected by the user input facility 202, and as will be explained further below.

In addition to text, contacts, images, and location information, the user interface facility 204 may provide the user access to various other content items to include in an electronic communication. Moreover, the user interface facility 204 can provide one or more additional user interfaces to facilitate providing the user access to the various other content items per the principles described herein.

As mentioned above, and as illustrated in FIG. 2, the system 200 may further include a communication facility 206. The communication facility 206 may facilitate receiving and sending data to and from the system 200. For example, the communication facility 206 can be configured to facilitate requesting content items from sources outside of system 200. To illustrate, upon a user interacting with a user interface to select a content item to include in an electronic communication, the communication facility 206 can request the selected content item from the corresponding source of the content item, and receive the content item for use by the system 200.

Similar to receiving content items for use in composing an electronic message, communication facility 206 can facilitate sending the electronic communication. For example, the communication facility 206 can package the various content items included in an electronic communication and put the electronic communication in any necessary form that is able to be sent through one or more of the communication channels and using an appropriate communication protocol, as described in detail above.

As discussed above, the system 200 can include a storage facility 208, as illustrated in FIG. 2. Storage facility 208 may maintain content item data 210 representative of information available to be included in an electronic message. In some examples, at least a portion of content item data 210 may be received from a social-networking system. Additionally or alternatively, user interface facility 204 may communicate with storage facility 208 to access and use content item data 210 to present content item information represented by content item data 210 within a user interface. In some examples, storage facility 208 may be configured to dynamically update content item data 210 in accordance with user interactions, user input, and/or receiving data from one or more sources outside of system 200 (e.g., a social-networking system). In addition, storage facility 208 may maintain user data. For example, storage facility 208 can maintain user data that allows the system 200 to interface and communicate with a social-networking system. Storage facility 208 may be configured to maintain additional or alternative data as may serve a particular implementation.

As will be described in more detail below, each of the facilities 202-208 can be used alone and/or in combination with the other facilities to provide a user interface used in composing and sending an electronic communication. In particular, the facilities 202-208 can be configured to provide a user interface with a split-pane configuration having a composition area and a tray area. In general, the tray area is configured to allow a user to access and navigate various content items to include in an electronic communication. In addition, once a particular content item is found, the user interface allows a user to easily move the content item from the tray area to the composition area. Once the content item is in the composition area, a preview of the content item is presented in the composition area. The user can then finalize and send the electronic communication.

Figure 3:
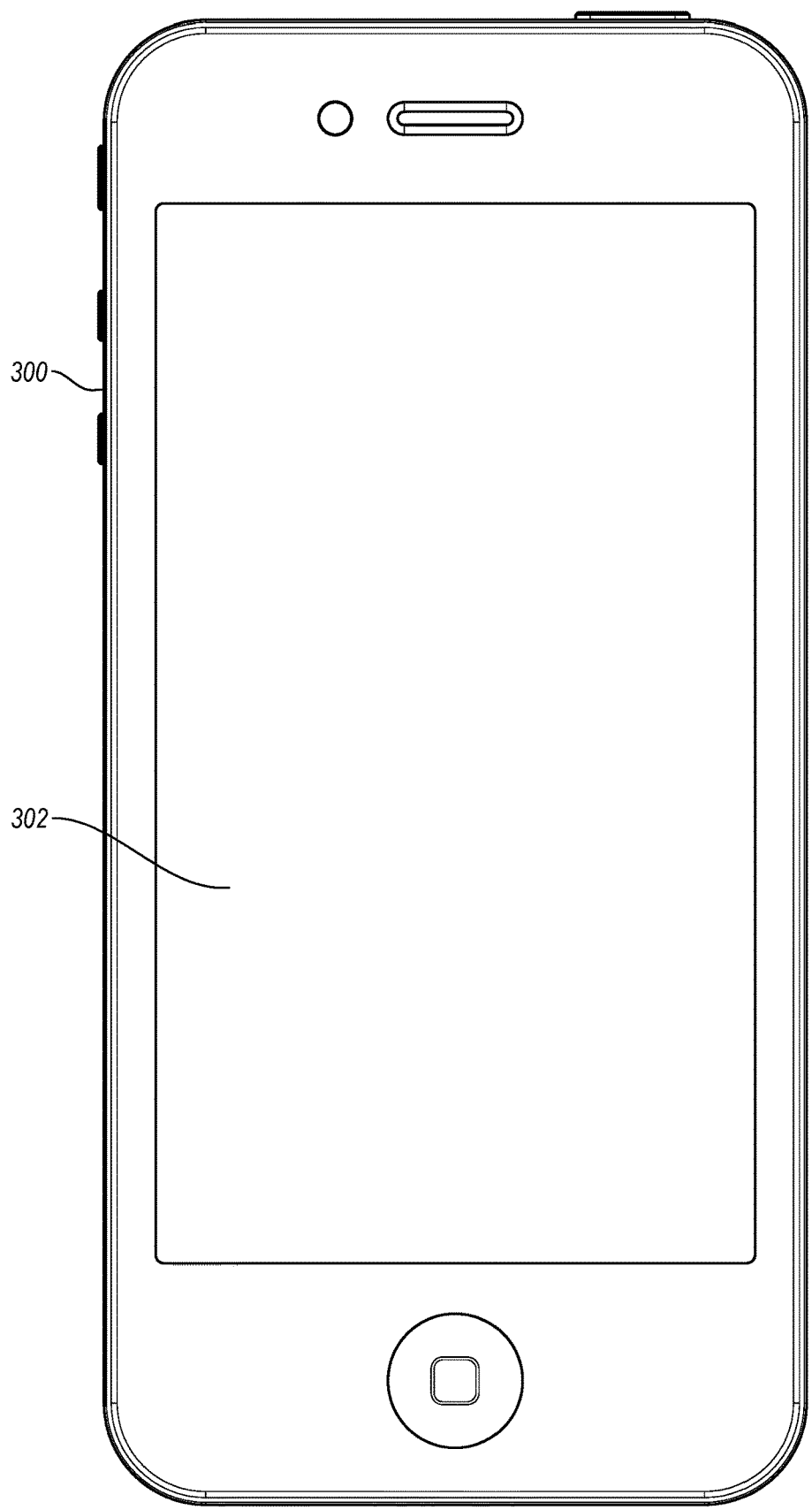
FIG. 3 illustrates an exemplary computing device implementing the system of FIG. 2 according to principles described herein.

In some examples, system 200 may be implemented partially or entirely on a computing device. For example, FIG. 3 illustrates an exemplary computing device 300 that may implement one or more of facilities 202-208. For example, computing device 300 may perform one or more operations associated with the presentation, processing, and/or management of a user interface, such as disclosed herein.

In FIG. 3, mobile device 300 is a mobile phone device (e.g., a smartphone). However, in additional or alternative examples, system 200 may be implemented by any other suitable computing device, such as, but not limited to, a tablet device, a handheld device, a laptop or desktop computer, a personal-digital assistant device, and/or any other suitable computing device configured to perform one or more of the processes and/or operations described herein. As illustrated in FIG. 3, computing device 300 may include and/or be associated with a touch screen 302 by way of which a user interface may be presented and/or by way of which user input may be received and/or detected. Additionally or alternatively, computing device 300 may include any other suitable input device (e.g., a keypad, one or more input buttons).

In some examples, a user may utilize touch screen 302 to provide one or more touch gestures, interact with a user interface, and/or access content item information. To illustrate, a user may utilize touch screen 302 to browse, search, and select content items available to be included in an electronic communication. For example, a user can utilize touch screen 302 to select one or more contacts from a contact list to be tagged in an electronic communication.

Regardless of the computing device, the electronic communication user interface system 200 can be implemented using a variety of systems and methods. FIGS. 4A-4E illustrate example implementations of a user interface that can be configured using the principles described herein.

Figure 4A:
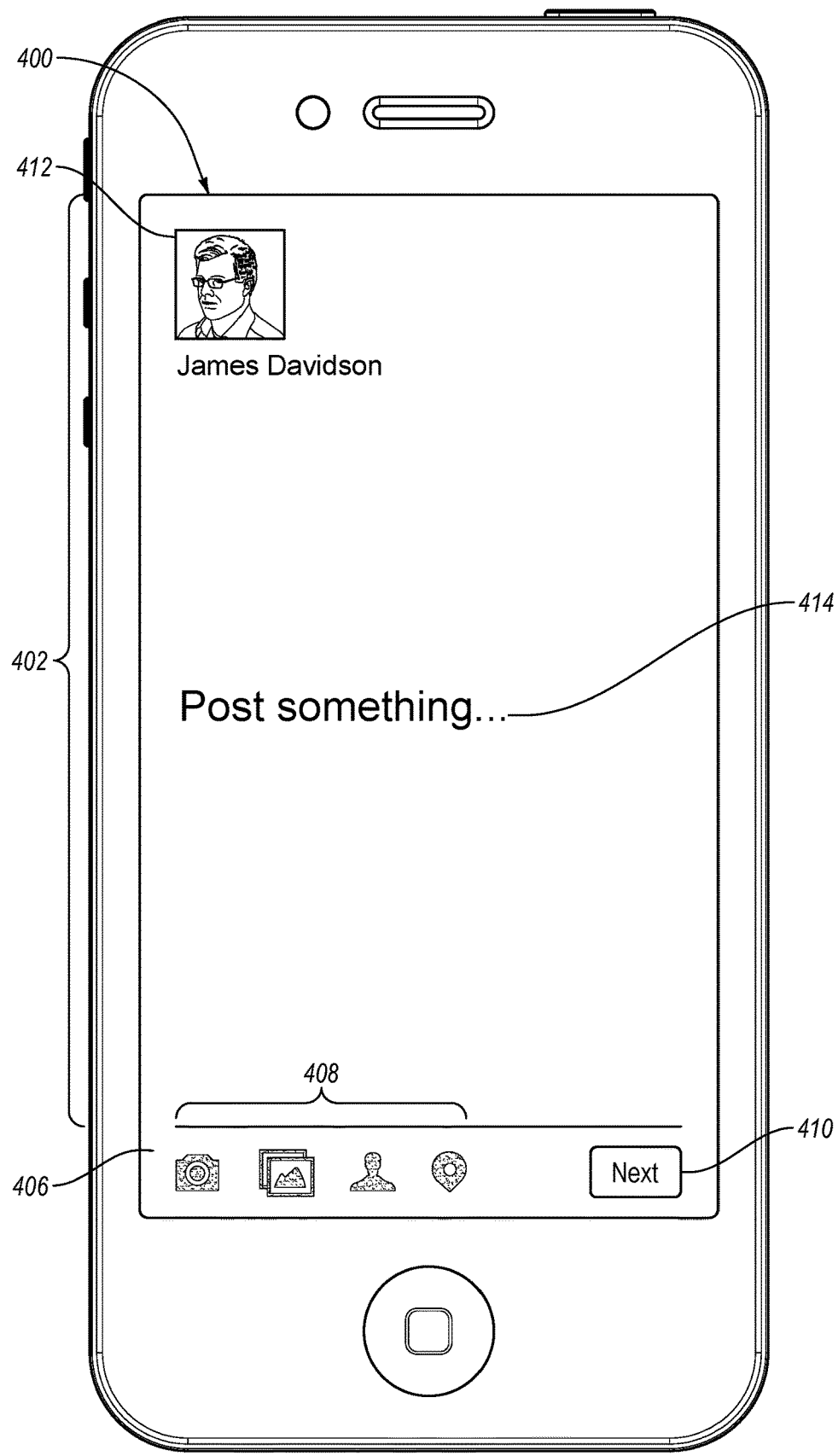
FIGS. 4A-4E illustrate exemplary views of an electronic communication user interface according to principles described herein.

FIG. 4A illustrates an example of an introduction display of an electronic communication user interface 400 (or simply "user interface 400"). For example, when entering the user interface 400, the user interface 400 may present a user with the display illustrated in FIG. 4A. As shown, the introduction display can include a menu area 406 located toward the bottom of the user interface 400. In addition, a composition area 402 can be displayed which includes a user graphic 412 and a prompt 414. The user graphic 412 and the prompt may indicate to the user that upon interacting with the composition area 402 or the menu area 406, the user can begin the process of composing an electronic communication (e.g., composing a social-network post).

From the introduction display, the user can interact with the composition area 402 or the menu area 406 to begin composing an electronic message. For example, the user may interact with the menu area 406. For example, as illustrated in FIG. 4A, the menu area 406 can include menu elements 408. The user can interact with one or more of the menu elements 408 to begin the process of composing an electronic communication. As will be explained further below, depending on which menu element 408 the user selects, the user interface 400 can present one of several modes that can be used to compose an electronic communication.

Additionally, the user can interact with the composition area 402 to begin composing an electronic message. For example, the user can provide a tap gesture to the touch screen over the composition area 402 portion of the user interface 400. Upon providing a tap gesture to the composition area 402, the user interface 400 can present a text mode in which the user can enter a message.

Figure 4B:
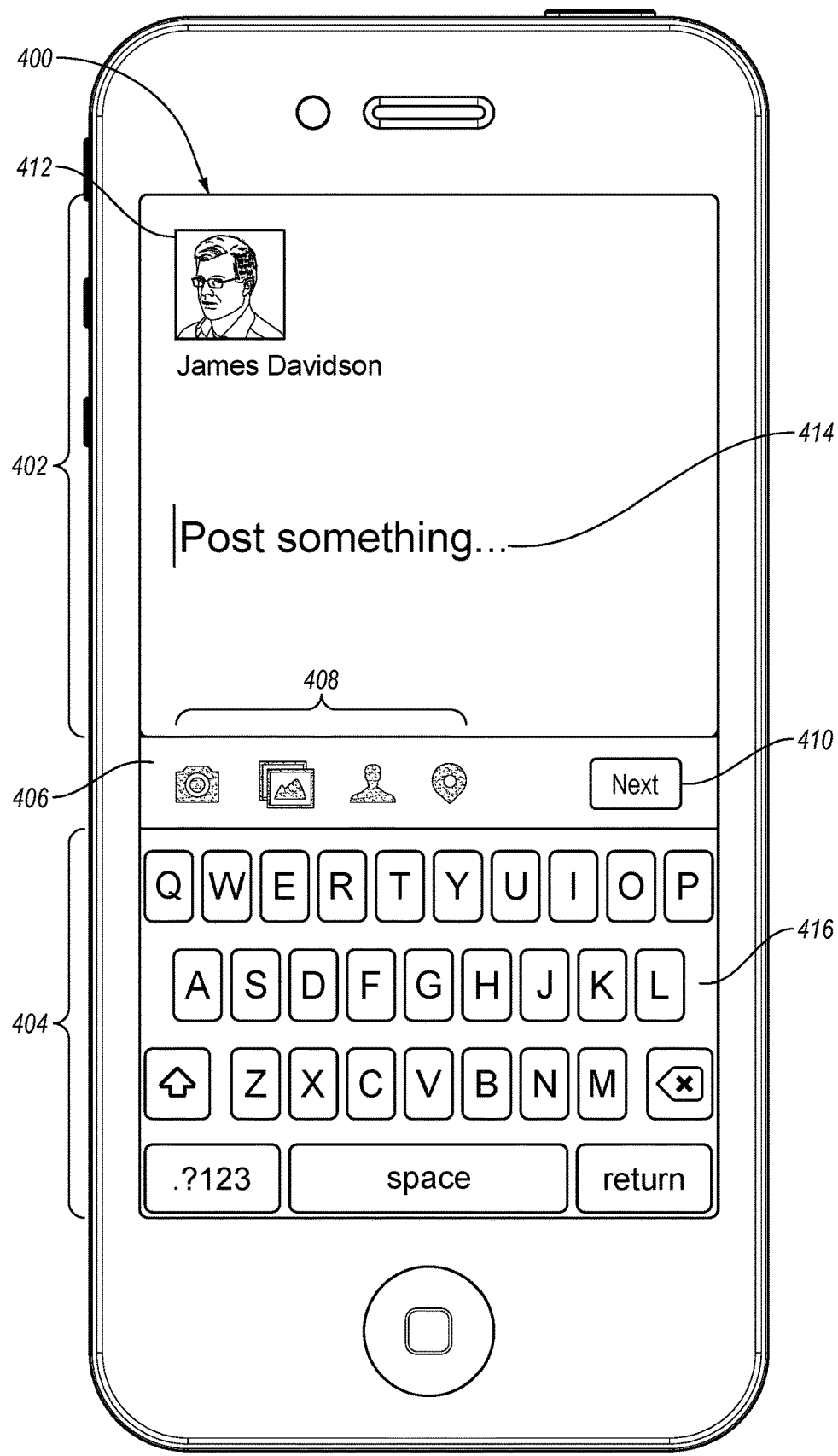

With reference to FIG. 4B, various example areas and features of the user interface 400 will be described. Generally, while in one of several modes, the user interface 400 can include the composition area 402 positioned above a tray area 404. Although the composition area 402 is shown above the tray area 404 in FIG. 4B, in alternative embodiments the tray area 404 may be located above the composition area 402. Moreover, FIG. 4B illustrates that the composition area 402 and the tray area 404 substantially occupy about the same amount of the touch screen area (e.g., the composition area 402 and the tray area 404 are shown to have an approximately equal splint-pane configuration). However, the percentage of the touch screen area that each of the composition area 402 and the tray area 404 occupy may vary from one embodiment to the next. In addition, the touch screen area occupied by each of the composition area 402 and the tray area 404 may be adjusted during use of the user interface 400 by the user for one or more purposes, as will be explained in greater detail below (see FIG. 6B).

In addition to the composition area 402 and the tray area 404, the user interface 400 can include the menu area 406. For example, and as illustrated in FIG. 4B, the menu area 406 can separate the composition area 402 from the tray area 404. In alternative implementations, the menu area 406 can be positioned elsewhere relative to both the composition area 402 and the tray area 404. For example, the menu area 406 may be positioned below the tray area 404 in alternative implementations.

As shown in FIG. 4B, the menu area 406 can include selectable menu elements 408. As used herein, "elements" or "user interface elements" can include graphics, icons, buttons, symbol, or other interface display(s) with which a user can interact to provide input into the user interface 400. For example, and as will be explained further below, a user can interact with menu elements 408 to navigate to content items presented in the tray area 404. In particular, menu elements 408 can each represent a particular type of content item (e.g., camera, image, contact, or location information). Therefore, a user can interact with menu elements 408 to navigate to a tray that contains a particular type of content item and/or to enable a particular feature available through the user interface 400.

In addition to the menu elements 408, the menu area 406 can include additional elements. For example, and as illustrated in FIG. 4B, the menu area 406 can include command element 410. As shown, command element 410 can comprise a selectable graphical "Next" option. A user can interact with command element 410 to proceed to a next step in composing and sending an electronic communication. In one example, interaction with the command element 410 can advance the user interface 400 to the last step in composing the electronic message and the electronic message can be sent upon a user interacting with the command element 410. In alternative implementations, by interacting with the command element 410, the user interface 400 presents a final preview of the electronic message with an option to send the electronic communication in the form previewed. Additional or alternative command elements may be included on the menu area 406 depending on the particular implementation of the user interface 400.

As illustrated in FIG. 4B, the composition area 402 may be positioned directly above the menu area 406. The composition area can be used to view a preview of content items that form the electronic communication. For example, and as illustrated in FIG. 4B, the composition area 402 can include a user graphic 412 for the user composing the electronic message or a user profile through which the user will send the electronic message. To illustrate, the user graphic 412 can include a photograph (e.g., a thumbnail image) of the user and a name of the user.

In addition, the composition area 402 can present additional content items to include in an electronic communication. In particular, a user can interact with the composition area 402 to compose text to include in an electronic communication. To intuitively indicate to the user that the composition area 402 can be used to compose a message, the composition area 402 can include a prompt 414 that invites or prompts the user to interact with the composition area 402 to input text. For example, as illustrated in FIG. 4B, the composition area can include the prompt 414. As shown, the prompt 414 can include a text prompt (e.g., "Post something . . . "). As additionally indicated in FIG. 4B, the prompt 414 can include a blinking cursor that can demonstrate the ability for the user to input text.

The user interface 400 can include various interface modes to provide the user various functionality when composing an electronic message. In particular, FIGS. 4B-4E illustrate the user interface 400 in various modes used to input content items to be included in an electronic communication. Each of the various modes has various elements presented to a user to allow a user to accomplish one or more goals when within a particular mode.

For example, FIG. 4B illustrates the user interface 400 in a text input mode. In one example embodiment, in response to the user's interaction with the composition area 402, the user interface 400 may present a graphical keyboard 416 within the tray area 404, as illustrated in FIG. 4B. For example, the user can interact with the touch screen by providing a tap gesture within the composition area 402, after which the keyboard 416 is presented to the user in the tray area 404. Once accessed, the user can use the keyboard 416 to enter text that is subsequently presented in the composition area 402. For example, the user can tap one or more keys on the keyboard 416 by way of the touch screen to input text.

As illustrated in FIG. 4B, none of the menu elements 408 are highlighted because the user interface 400 is in text input mode. For example, the keyboard 416 itself can indicate to the user that the user interface 400 is in text input mode. Alternatively, the menu elements 408 may include a text element (not shown) that is highlighted or otherwise made to standout from the other menu elements 408 to indicate the text input mode.

Figure 4C:
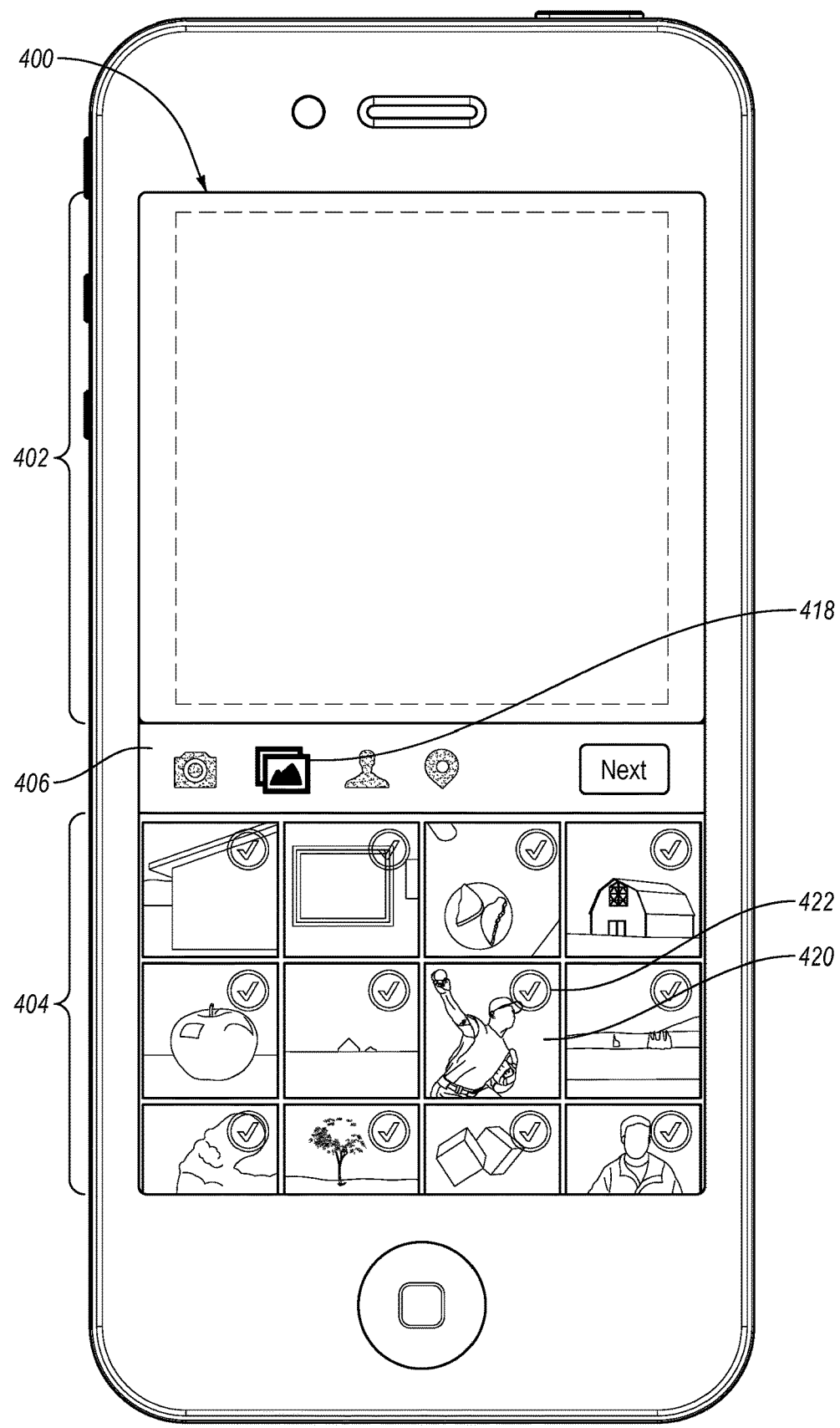

In addition to the text input mode, the user interface 400 can include an image input mode. As shown in FIG. 4C, when in image mode, an image element 418 located in the menu area 406 is highlighted or otherwise made to standout from the other menu elements to indicate the display of the image interface mode. Upon entering image input mode, the composition area 402 may be blank indicating that no image has been selected to be included in the electronic communication, as shown in FIG. 4C. Alternatively, if a user had previously selected an image, then upon returning to the image input mode, the image may be presented in the composition area 402.

Furthermore, when in image input mode, the user interface 400 can present image tiles, such as image tile 420, in the tray area 404, and illustrated in FIG. 4C. For example, an array of image tiles 420 can be presented within the tray area 404 providing the user with a presentation of potential images to include in an electronic communication. The image tile 420 can have various sizes and configurations depending on a particular implementation of the user interface 400.

In one example implementation, the image tile 420 can be a thumbnail version of the image that it represents. To illustrate, FIG. 4C shows image tile 420 to be a thumbnail version of an image of a baseball pitcher. In alternative implementations, the image tile 420 can be text (e.g., an image description or a file name), another symbol, or any other graphic that may be used to represent the image with which the image tile 420 is associated.

As further shown in FIG. 4C, the image tile 420 can include a selection indicator 422. The selection indicator 422 can be a graphic that presents the user with an indication of whether or not the image is selected to be included in an electronic communication. For example, and as illustrated in FIG. 4C, the selection indicator 422 can be grayed, or an emptied outline, to indicate that the image associated with the image tile 420 has not been selected. Once an image is selected, the selection indicator 422 can be highlighted, filled in, or otherwise changed from the non-selected appearance, to indicate that the image associated with the image tile 420 is selected to be included in the in electronic communication (see FIG. 7C).

Figure 4D:
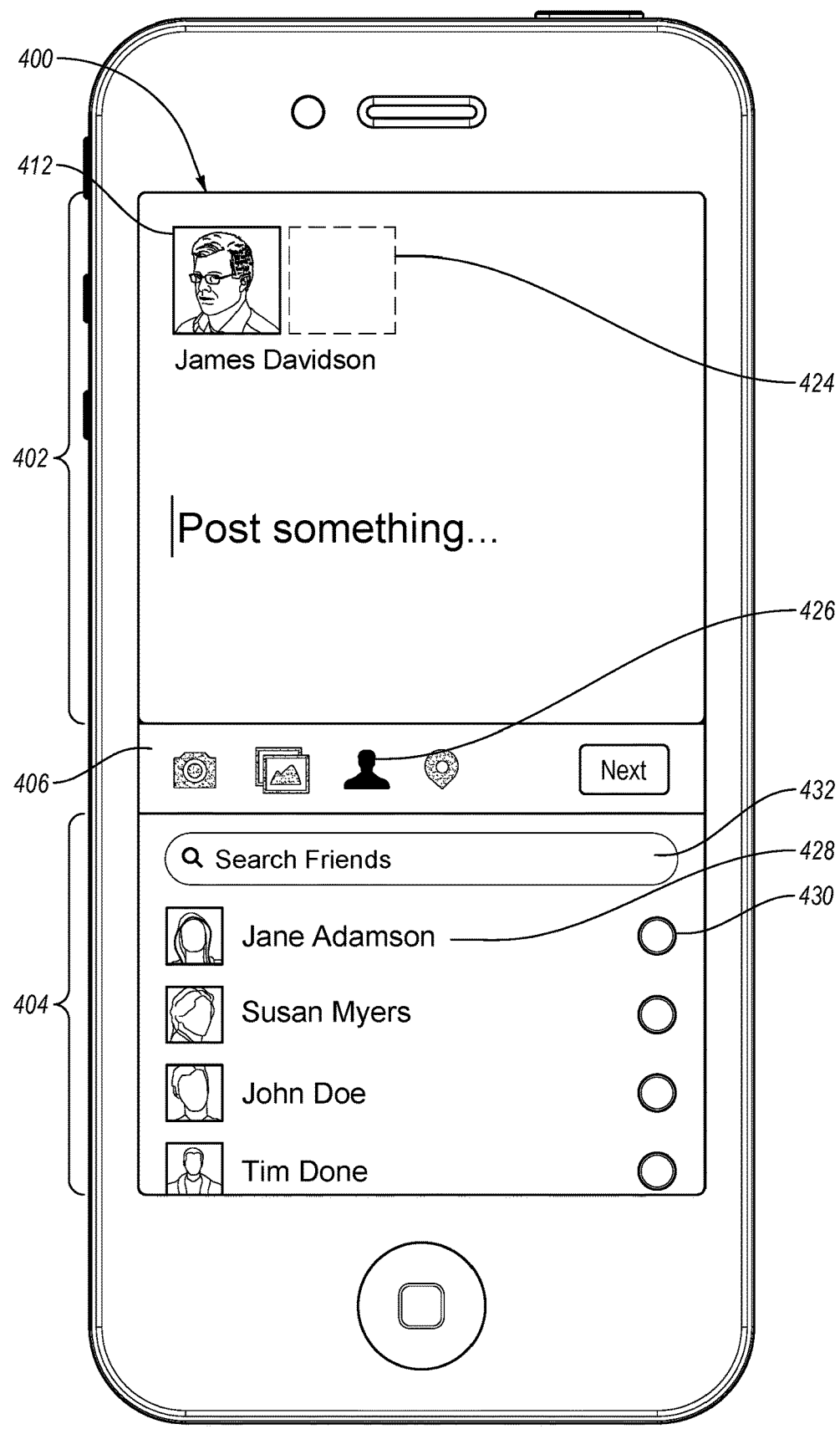

FIG. 4D illustrates another example mode within the user interface 400. As shown in FIG. 4D, the user interface 400 can include a contacts mode. In particular, the user interface 400 can provide a mode that allows a user to select one or more contacts to be tagged in an electronic communication. As illustrated in FIG. 4D, when the user interface 400 is in contacts mode a contact element 426 corresponding to the contacts mode may be highlighted or otherwise made to standout to indicate to a user that the user interface 400 is in contacts mode.

When in contacts mode, the composition area 402 can present one or more contact graphics 412. In addition, the composition area 402 can present a contact placeholder 424, as shown in FIG. 4D. The contact placeholder 424 may provide an indication or prompt to the user to add one or more additional contacts to be tagged in the electronic communication. For example, upon a user selecting an additional contact, the contact placeholder 424 may be filled with a contract graphic for the newly selected contact. Any number of contact graphics may be presented in the composition area 402. If enough contacts are entered to fill the composition area 402, then the system 200 (e.g., user interface facility 204) can activate a scroll function within the composition area 402 to provide a user with the ability to scroll through the selected contacts to verify the contacts tagged in the electronic communication.

Similar to the previous user interface 400 modes, while in the contacts mode, the tray area 404 is populated with a plurality of contacts. For example, and as illustrated in FIG. 4D, a listing of contacts can populate the tray area 404. The contact list can include contact information 428 for each contact listed. For example, contact information 428 can include an image representing the contact (e.g., photo of the contact) and the name (e.g., a username) of the contact. In additional or alternative implementations, the contact information 428 can include more or less contact information than is illustrated in FIG. 4D.

In addition to the contact information 428, each contact listed can be associated with a selection indicator 430. The selection indicator 430 illustrated in FIG. 4D includes a radio button. When empty (as shown in FIG. 4D), the selection indicator 430 may indicate that the contact is not selected to be tagged in the current electronic communication. When a user selects a contact, the selection indicator 430 may be a radio button filled in to indicate that the particular contact has been selected (not shown). In alternative implementations, other graphics, icons or symbols may be used to indicate that a particular contact has been selected to be tagged in the electronic communication.

As mentioned, the tray area 404 can include the contact list. In addition to the contact list, the tray area 404 can include a search bar 432 to provide the user with a fast and convenient interface to look up a contact. To use the search bar 432, for example, a user can tap on the search bar 432. In response to the user interaction with the search bar 432 (e.g., tapping the search bar with a finger), the user interface 400 can provide a keyboard with which the user may input text to search for a particular contact. Upon entering a search query, the contact list can be narrowed down to the contact or contacts that most closely match the search term (e.g., the results of the contact search can be presented in tray area 404). The search bar 432 can be used to search contacts maintained within system 200, contacts maintained on the computing device, and/or contacts maintained on a social-networking system.

Figure 4E:
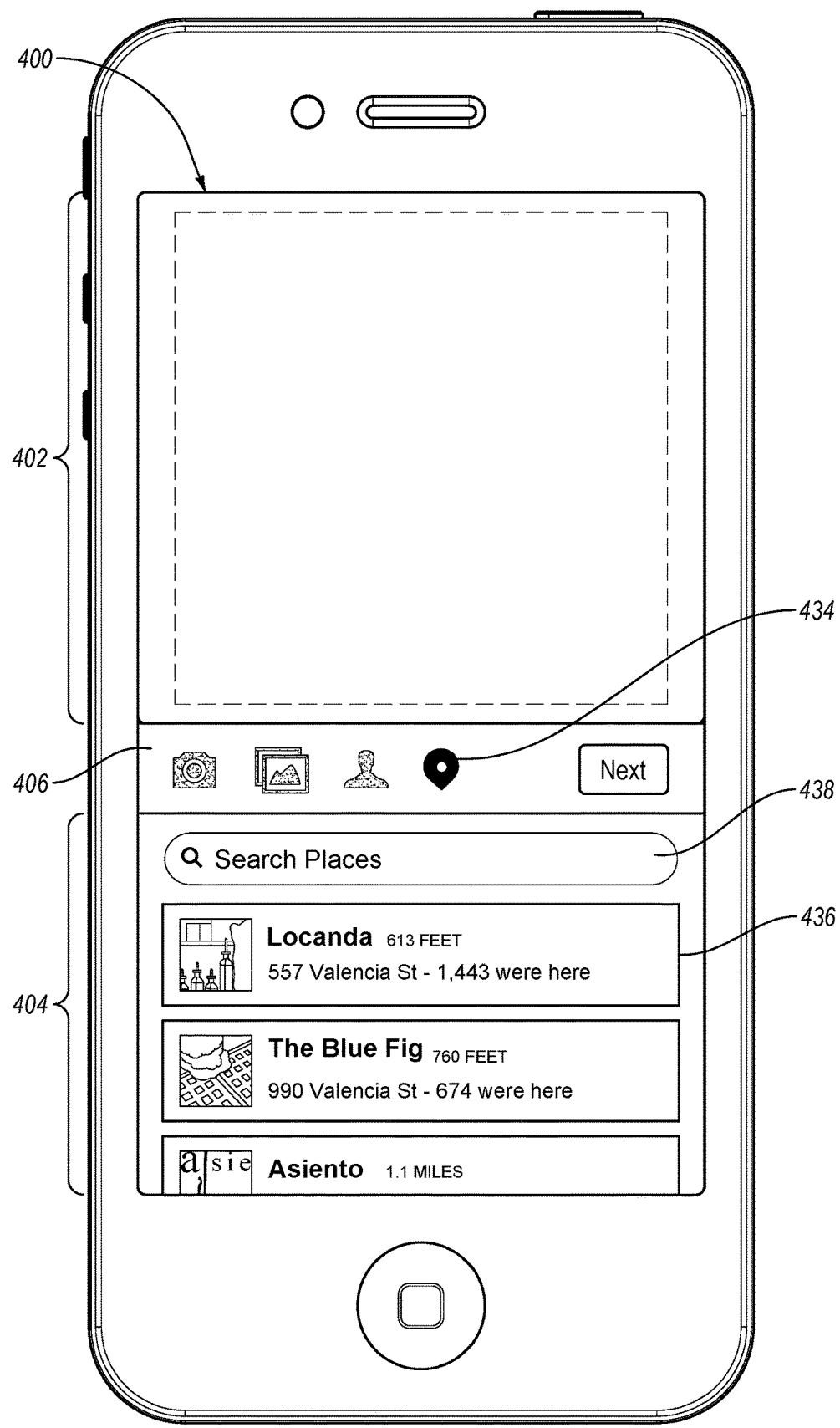

In addition to the contacts mode, the user interface 400 can include a location mode that provides the user the ability to browse, search, and select a location to include (e.g., tag) in an electronic communication. As illustrated in FIG. 4E, when the user interface 400 is in location mode a location element 434 in the menu area 406 may be highlighted or otherwise made to standout to indicate to a user that the user interface 400 is in location mode.

Similar to other modes, when entering the location mode the composition area 402 can be clear or include an empty placeholder to indicate that no location has been added to an electronic communication. Furthermore, the tray area 404 can include one or more location tiles 436, as illustrated in FIG. 4E. For example, the tray area 404 can include a list of location tiles. Each location tile 436 can represent location information for a particular location, point-of-interest, business, or other place. Location information can include, but is not limited to, geographic coordinates, map data, a name or title, a description, address information, distance from user, the number of other users (e.g., users of a social-networking system) that have visited the location, and any other information.

As illustrated in FIG. 4E, the location tile 436 can include name information, address information, number of visits information, and user distance from the location. Moreover, each location tile 436 can include a graphic that represents the particular location. For example, the graphic may be a thumbnail version of map data. Alternatively, the graphic may be a business logo, an image of the location, an icon, or other identifier that shows a visual representation of the particular location associated with the location tile 436.

Just as the contents of the location tiles 436 can vary from on implementation to the next, the order in which the location tiles 436 are presented can vary. In one example embodiment, the location tiles 436 are presented in an order of locations closest to the user. The location tiles 436 can be dynamically updated as the user (e.g., the computing device) travels from one location to another. Alternatively or additionally, the location tiles 436 can be ordered per user-specific settings. For example, the location mode can be configured to display only a certain type of location (e.g., restaurants, shopping, or other specific locations).

Similar to the contacts mode, the location mode shown in FIG. 4E can include a search bar 438 to allow a user to search for places. In response to the user interaction with the search bar 438 (e.g., tapping the search bar with a finger), the user interface 400 can provide a keyboard with which the user may input text to search for a particular location. Upon entering a search query, the location list can be narrowed down to the location or locations that most closely match the search term (e.g., the results of the location search can be presented in tray area 404). The search bar 432 can be used to search locations maintained within system 200, locations maintained on the computing device, and/or locations maintained on a social-networking system.

Figure 5A:
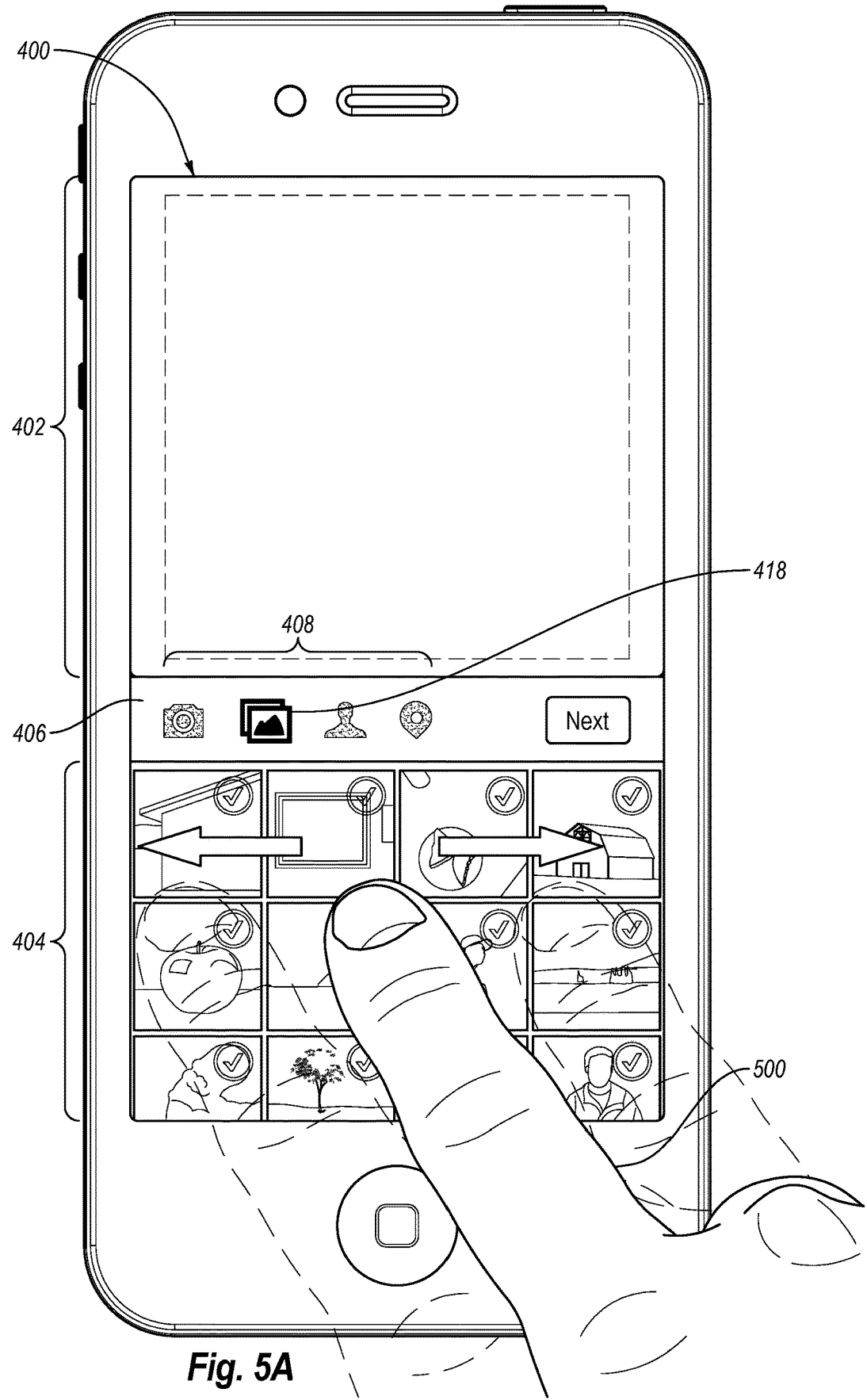
FIGS. 5A-5B illustrate additional exemplary views of an electronic communication user interface according to principles described herein.
Figure 5B:
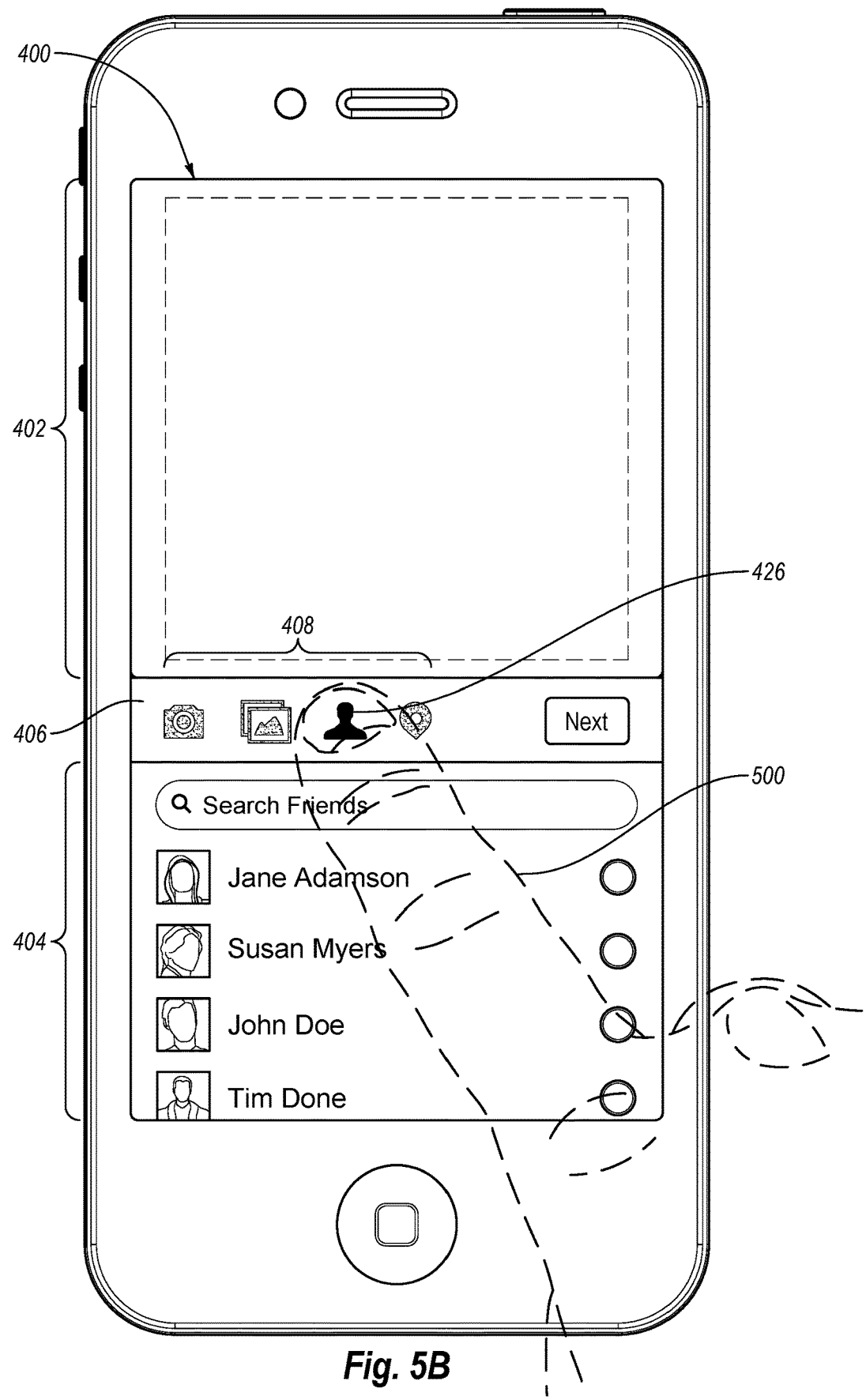

As a general summary, FIGS. 4A-4E illustrate various example modes that the user interface 400 can use to allow a user to include various types of content items (e.g., text, contacts, images, and location information) within an electronic communication. FIGS. 5A-5B illustrate how a user can easily and efficiently navigate the various modes within the user interface 400.

In one example embodiment the user can use a "swipe" gesture to move from one mode to another. For example, and as illustrated in FIG. 5A, the user can use a finger 500 to interact with the touch screen of the computing device. Using a swiping side-to-side gesture within the tray area 404, the user can cause the user interface 400 to switch between modes. In particular, FIG. 5A illustrates the user interface 400 in the image mode (as explained above with reference to FIG. 4C). Upon placing the finger 500 on the tray area 404 and moving the finger toward the right of the tray area 404 in a swiping gesture, the user interface 400 can change from the image mode to the camera mode (discussed in more detail below with respect to FIGS. 8A-8B). Alternatively, for example, upon placing the finger 500 on the tray area 404 and moving the finger toward the left of the tray area 404, the user interface 400 can change from the image mode to the contacts mode.

When changing from one mode to the next, the user interface 400 can present a transition animation of one type of content item within the tray area 404 horizontally sliding out of the tray area 404, while a second type of content item horizontally slides into the tray area 404. For example, upon the user providing a left-swipe gesture while in the images mode shown in FIG. 5A, the user interface 400 can present the image tiles moving toward the left and out of the tray area 404. Simultaneously, the list of contacts that will be presented in the contacts mode can slide into the tray area 404 from the right side of the tray area 404. In particular, a portion of the image tiles and a portion of the contact list is presented simultaneously during the transition from the image mode to the contacts mode. Once the image tiles have moved completely out of the tray area 404, the contact list will be fully presented in the tray area 404.

In addition, the highlighting of the menu elements 408 can change during the transition from one mode to another. Continuing with the example in the above paragraph, once the contact list is fully presented in the tray area 404, the highlighting of the image element 418 can be removed so that the image element 418 is grayed. Upon graying the image element 418, the contact element 426 can be highlighted, indicating that the user interface 400 has transitioned to the contacts mode.

The user can continue to interact with the touch screen using any number of left or right side-to-side swipe gestures to access the mode the user desires to use. For example, from the image mode illustrated in FIG. 5A, the user can provide a single left-swipe gesture to change from the image mode to the contact mode. The user can provide a second left-swipe gesture to change from the contact mode to the places mode. The user can provide a third left-swipe gesture to change from the location mode to the camera mode. Finally, the user can provide a fourth left-swipe gesture to change form the camera mode back to the images mode. In this way, the user can use one or more side-to-side swipe gestures within the tray area to navigate the various modes within the user interface 400.

FIG. 5B illustrates a second example of a user navigating between the various modes of the user interface 400. For example, the user can interact with one or more menu elements 408 to transition from one mode to the next. In particular, the user can provide a tap gesture with a finger 500 to any one of the menu elements 408 to change to the mode represented by the particular menu element 408. To illustrate, FIG. 5B illustrates the user's finger 500 tapping the contact element 426, thus changing the mode to the contacts mode. As illustrated in FIG. 5B, the contact element 426 can be highlighted upon the user providing the tap gesture with the user's finger 500.

Just as with the swipe gesture explained above, when the user uses the tap gesture on one of the menu elements 408, the contents of the tray area 404 can transition from one type of content item to another type of content item. The transition can be done in the same way as explained above with respect to the horizontal moving in and out of the different types of content items. Alternatively, the transition can be a fading out of one type of content item and a fading in of another type of content item. Moreover, the transition can be very abrupt; meaning that one type of content item simply disappears and is immediately replaced with a second type of content item.

Figure 6A:
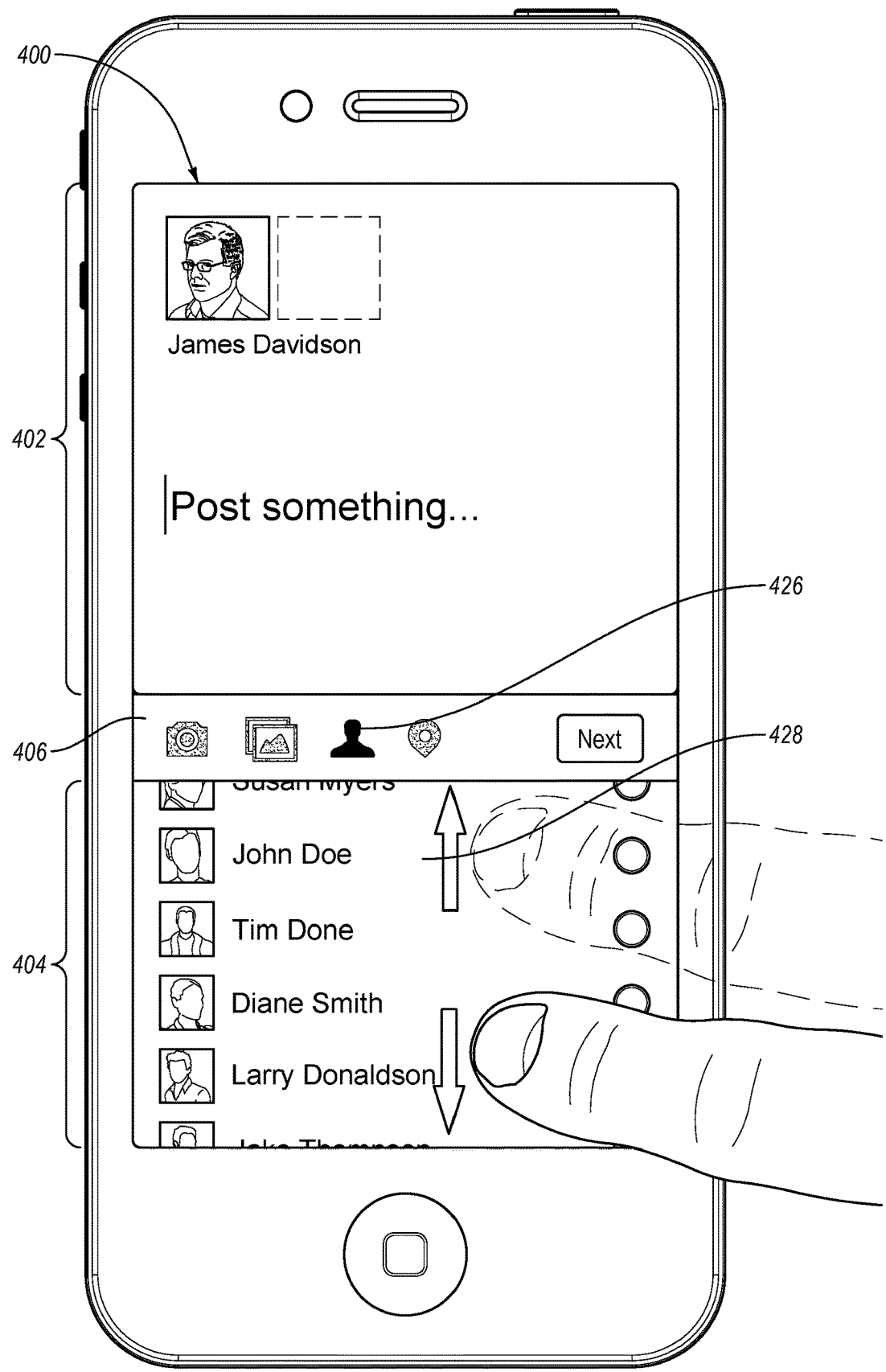
FIGS. 6A-6B illustrate additional exemplary views of an electronic communication user interface according to principles described herein.
Figure 6B:
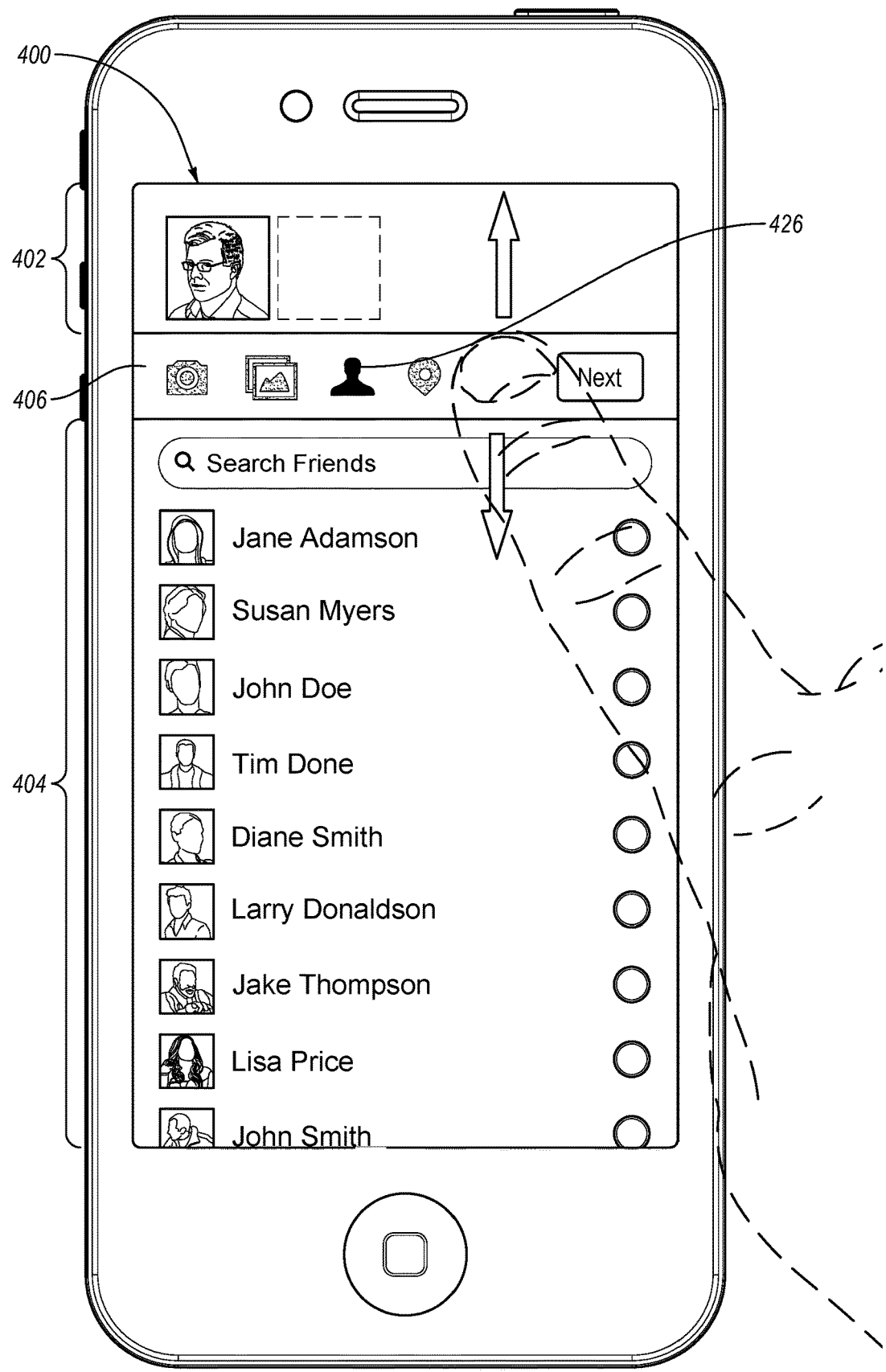

Not only can the user interface 400 provide navigation from one mode to the next, but the user interface 400 can also provide navigation functions within each mode. FIGS. 6A-6B illustrate principles of navigating through content items contained in a particular mode. For example, FIGS. 6A-6B illustrate example navigation features within the contact mode. However, the navigation techniques explained with respect to the contact mode can be used with any other mode included in the user interface 400.

As illustrated in FIG. 6A, a user can navigate through content items within the tray area 404 by providing a vertical swipe gesture to the touch screen. For example, the user can navigate through the contact list in the tray area 404 by providing an up or down swipe gesture to initiate a vertical scrolling of the contacts in the contact list. In addition, by providing a quick vertical swipe and releasing (e.g., a vertical flick gesture), the contact list can continue to scroll after the user has released the user's finger 500 from the touch screen. After releasing the user's finger 500 from the touch screen, the scrolling of the contact list can be at a maximum speed and then gradually decelerate and come to stop in accordance with inertial scrolling procedures. The maximum speed of scrolling, and the rate of deceleration can vary from one embodiment to the next.

Similar to the contact list, the user can navigate through other content items in the other modes of the user interface 400. For example, the user can scroll through images and locations using a vertical swiping gesture as explained above.

In addition to the scrolling feature, the user interface 400 can include additional navigation features to allow a user to easily access one or more content items within the various modes. For example, FIG. 6B illustrates that in one example implementation the tray area 404 can be extended to provide the user with a larger viewing area of the content items within the tray area 404. For example, the user can interact with the menu area 406 using a vertical touch-and-drag gesture to drag the menu area 406 vertically up or down to increase or decrease the viewable contents of the tray area 404. As illustrated in FIG. 6B, the user has interacted with the menu area 406 with the user's finger to drag the menu area 406 toward the top of the user interface 400, thus causing the tray area 404 to enlarge and display several additional contacts. Once the size of the tray area 404 is adjusted, the user may continue to navigate the contacts.

Upon locating a contact, or otherwise finishing browsing or searching the contacts, the user can readjust the size of tray area 404 by interacting with the menu area 406 and providing a vertical downward drag gesture to drag the menu area 406 toward the bottom of the user interface 400. In some example implementations, the user interface 400 can set maximum and minimum vertical positions of the menu area 406 (e.g., corresponding to maximum and minimum sizes of the tray area 404). A user can position the menu area 406 in a position between the maximum and minimum vertical positions. In one example implementation, upon changing from one mode to another mode, the vertical position of the menu area 406 is reset to a default position. In some implementations, each mode may have a corresponding default position to which the menu area 406 is dynamically changed as a user navigates between the available modes. Alternatively, the vertical position of the menu area 406 can remain constant upon changing from one mode to another mode.

Using the navigation features described with reference to FIGS. 5A-5B to access a particular mode, and using the navigation features described with reference to FIGS. 6A-6B to locate a particular content item within the particular mode, the user may select the content item to include or tag in the electronic communication. FIGS. 7A-7D illustrate various example implementations of selecting a content item to include in an electronic communication. Again, for example purposes, the selection of a content item is explained with reference to the images mode. However, the same functions and principles can be used within other modes as well to select content items corresponding to any particular mode.

Figure 7A:
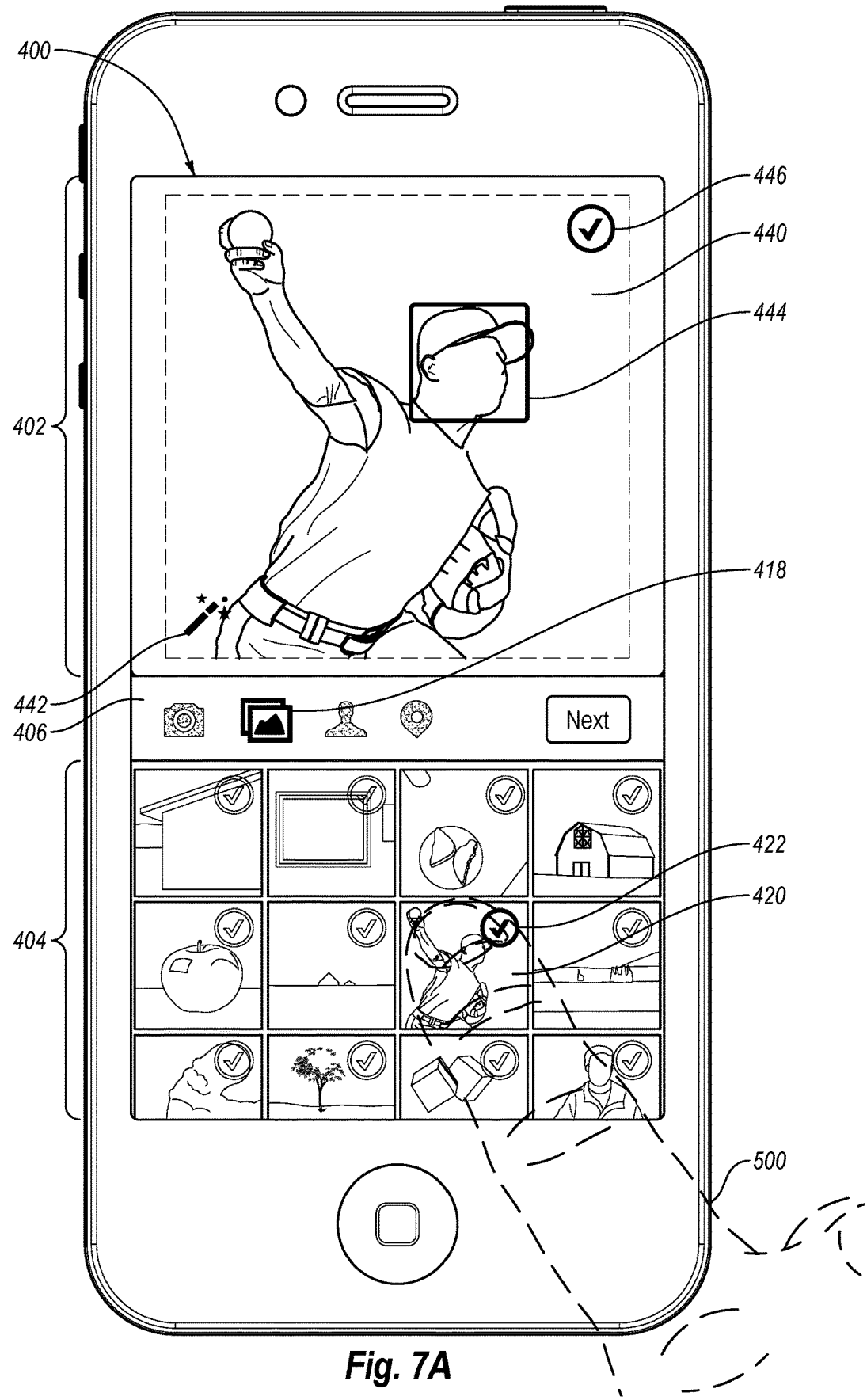
FIGS. 7A-7D illustrate additional exemplary views of an electronic communication user interface according to principles described herein.

FIG. 7A illustrates one example of a user selecting a content item within the user interface 400. In particular, FIG. 7A shows that a user can interact with the touch screen by providing a tap gesture on the image tile 420. Upon tapping the image tile 420, the user interface 400 can present an image 440 in the composition area 402 that corresponds to the image tile 420. If the user leaves the image 440 in the composition area 402, then upon the user sending the electronic message, the image 440 will be included in the electronic message. In addition, the image 440 can include a selection indicator 446 illustrating that the image is selected. The selection indicator 446 can be an element used to remove the image from the composition area 402, and thus remove the image from an electronic communication, as will be explained in greater detail below.

As further illustrated in FIG. 7A, upon selecting the image tile 420, the selection indicator 422 is highlighted indicating that the image corresponding to the image tile 420 is currently selected to be part of the electronic communication. The user can perform additional tap gestures to select additional image tiles, and thereby add additional images to the electronic communication. Any number of images can be added to the electronic communication.

In addition to displaying the image 440, the composition area can provide one or more features that allow a user to adjust or edit the image. For example, an image-editing element 442 can be presented over the image 440. The user can interact with the image-editing element 442 to be provided with various image-editing options, such as brightness contrast, sharpness, position, rotation, cropping, filtering, color changes, and any other image editing features desired for a particular implementation. The editing features may be provided directly in the composition area, or alternatively, the user interface 400 can transition to an image-editing mode to allow the user to perform the image editing desired.

In addition to the image-editing features, the user interface 400 can further provide a tagging element 444, as illustrated in FIG. 7A. For example, the tagging element 444 can be a square surrounding a face of a person in the image 440. In one example, one or more faces can be detected in the image 440 as a way to suggest to the user that the one or more people could be tagged in the image 440. The user can interact with the tagging element 444 (e.g., by providing a tap gesture on the tagging element 444) to tag the person identified by the tagging element 444 in the image 440. Upon interacting with the tagging element 444, the user interface 400 can present to the user one or more options to enter the contact information for the person to be tagged. For example, upon interacting with the tagging element 444, the user interface 400 may transition to the contacts mode to allow a user to select a contact. Alternatively, or in addition to, the user interface 400 may present an input box into which the user can provide input data (e.g., name) of the person to be tagged in the image 440.

Figure 7B:
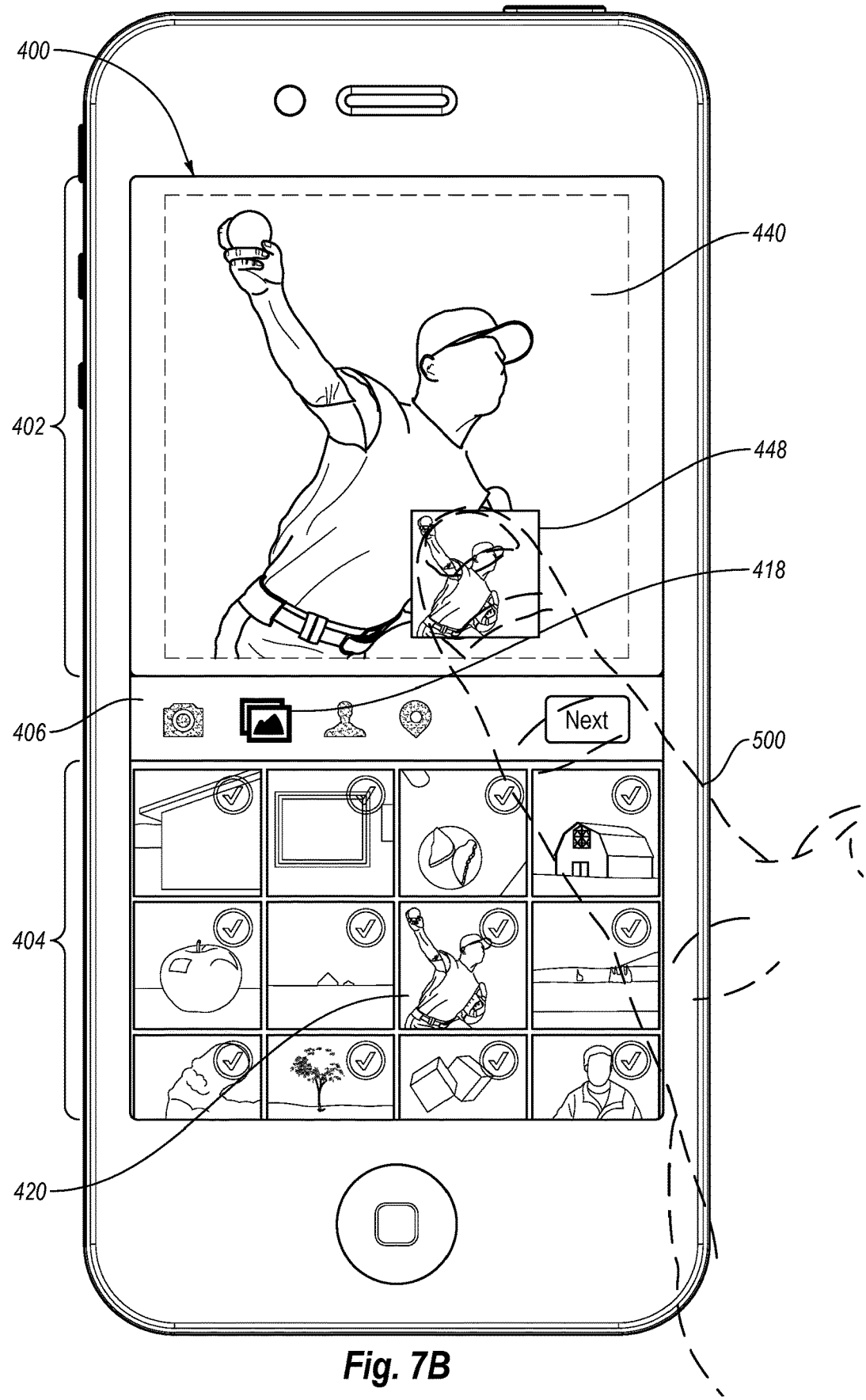

FIG. 7B illustrates a second example in which a user can select a content item from the tray area 404 to move to the composition area 402, and thus include the content item in an electronic communication. As shown in FIG. 7B the user, with the user's finger 500, can interact with the touch screen by touching the image tile 420. While maintaining contact with the image tile 420, the user can provide a dragging gesture from the tray area 404 toward the composition area 402. Upon providing the dragging gesture, the user interface 400 provides a cutout 448 of the image tile 420 and moves the cutout 448 with the user's finger 500. Thus, the user interface 400 provides an interface that appears to be moving the image tile 420 from the tray area 404 to the composition area 402 by picking up and moving the cutout 448 of the image tile 420, as illustrated in FIG. 7B.

Upon the user reaching the composition area 402 with the drag gesture, the user interface 400 can present the image 440 corresponding to the image tile 420. At this point, the user can continue to hold the cutout 448 in the composition area 402 by not releasing contact between the user's finger 500 and the touch screen. If the user drags the cutout 448 back toward and into the tray area 404, the presentation of the image 440 disappears, or is removed, from the composition area 402. Thus, the user can view previews of images by dragging corresponding image tiles into and out of the composition area 402.

In one example implementation, the user interface 400 can use a variety of visual effects or animations when moving the cutout 448 into and out of the composition area 402. For example, upon moving the cutout 448 into the composition area 402, a small version of the image 440 can appear substantially in the center of the composition area 402 and then expand, while maintaining a substantially consistent aspect ratio, to fill the composition area 402. The rate at which the image 440 expands to fill the composition area 402 can vary from one implementation to the next. Likewise, when removing the cutout 448 (or otherwise unselecting the image 440) the image 440 can shrink to disappear from the composition area 402. Thus, when dragging the cutout 448 into and out of the composition area 402, various effects and/or animations can be applied to the image 440 to populate the composition area 402 and provide a preview of the image 440.

Figure 7C:
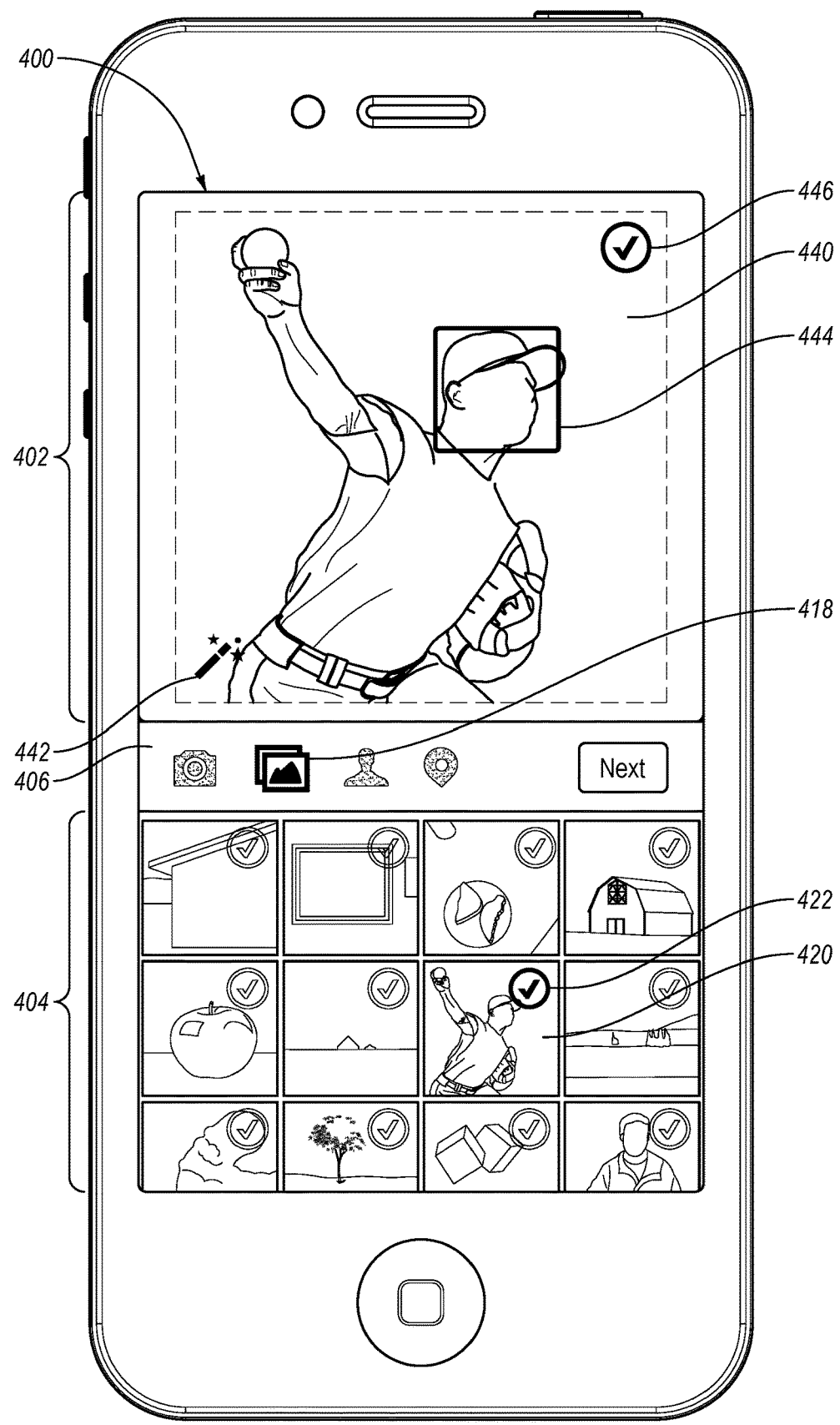

Using the above principles, the user interface 400 can allow a user to easily preview a content item without having to select and unselect the content item using multiple steps. Rather, for example, the user can simply drag the cutout 448 to the composition area 402, view the preview of the image 440, and if the image 440 does not meet the user's needs, the user can simply and quickly drag the cutout 448 back to the tray area 404 and remove the preview from the composition area 402, and thus remove the image 440 from the electronic communication. Alternatively, if the image 440 meets the user's needs, the user can simply release the user's finger 500 from the touch screen and the image 440 remains in the composition area 402, and thus in the electronic communication, as illustrated in FIG. 7C. FIG. 7C illustrates the image 440 in position to be included in the electronic communication. In particular, FIG. 7C illustrates a preview of the image 440 located in the composition area 402, the selection indicator 422 is highlighted, and the selection indicator 446 is highlighted.

Figure 7D:
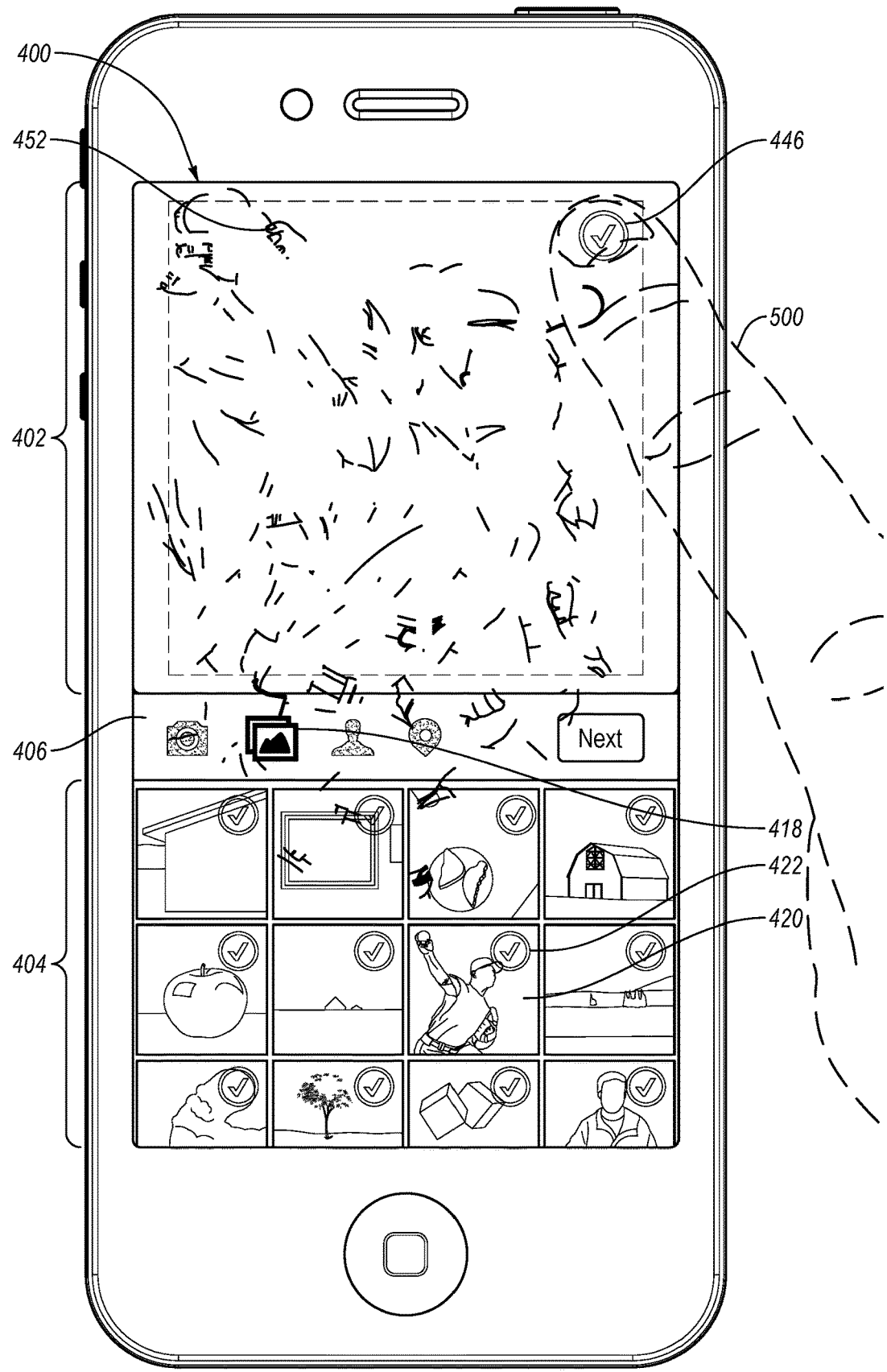

At times, after adding a content item to an electronic communication, the user may wish to remove the content item prior to sending the electronic communication. FIG. 7D illustrates an example implementation of removing a content item from the composition area 402, and thus from the electronic communication. For example, a user can provide a tap gesture to the touch screen over the selection indicator 446 (or alternatively the user can tap the image tile 420) to provide an input through the user interface 400 to remove the image 440 from the electronic communication. Upon tapping the selection indicator 446, the image 440 can be removed from the composition area 402.

Various animations and transitions can be used to indicate the removal of a content item from the composition area 402. For example, and as shown in FIG. 7D, the user interface 400 can provide a shattering animation effect to the image 440. In particular, the contents of the image 440 can appear to break into a plurality of shattered pieces 452, as illustrated in FIG. 7D. The shattered pieces 452 can be made to fall through the user interface 400 (e.g., through the composition area 402, menu area 406, and the tray area 404), and/or disappear from view.

In one example implementation of the shattering animation, the user interface 400 presents a shatter animation upon the user providing an interaction to remove a content item. For example, the user interface 400 can transition quickly from presenting the image 440, removing the image 440 from the composition area, and presenting an animation such that it appears the image 440 actually shattered or disintegrated from the composition area 402. The removing of the image 440 and the presenting of the shattering animation can overlap if necessary to provide a more seamless shattering effect. In an alternative implementation, a shattering program routine can actually be applied directly to the image to provide the shattering effect. Addition animations and/or transitions for removing a content item from the composition area 402 may be used. For example, the image 440 may be made to move back toward the image tile 420 to appear to join up or move back into the image tile 420.

It is understood that the information presented in, and removed from, the composition area 402 can vary depending on the mode of the user interface 400 and the type of content item being selected. For example, the same or similar gestures, features, transitions, effects, animations and functions can be used in the selection of a contact when in contact mode. In particular, when selecting a contact, the contact's picture, name, and other information can be presented and or removed in and from the composition area 402 using the same principles described with respect to FIGS. 7A-7D.

In addition, the same or similar gestures, features, and functions can be used in the selection of a location when in location mode. In particular, when selecting a location, the location information associated with the location can be presented in the composition area 402. In one example embodiment, upon selecting a location tile 436, a map of the location and the surrounding geographic area can be presented and removed in and from the composition area 402 using the same principles described herein with respect to FIGS. 7A-7D.

Figure 8A:
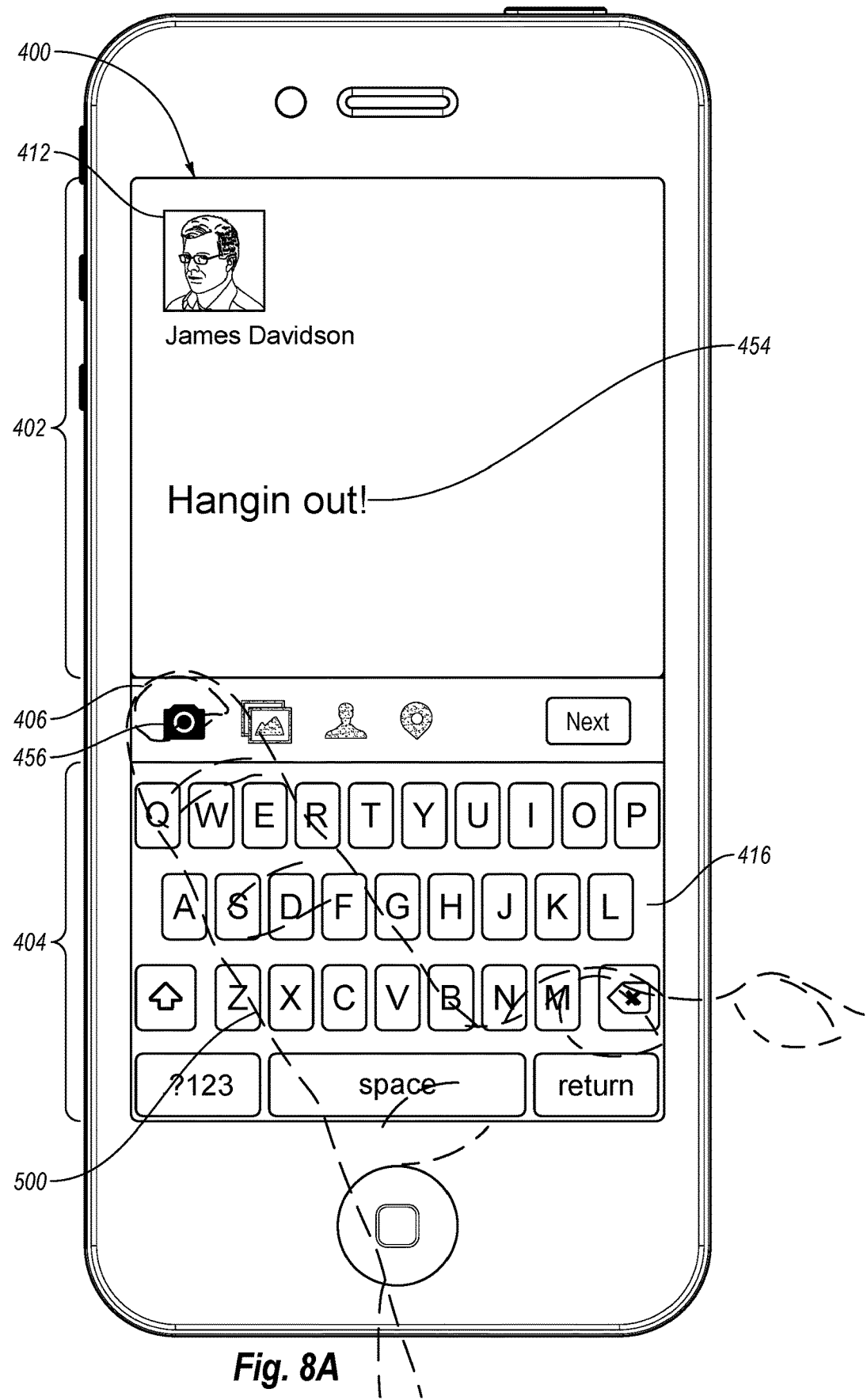
FIGS. 8A-8B illustrate additional exemplary views of an electronic communication user interface according to principles described herein.
Figure 8B:
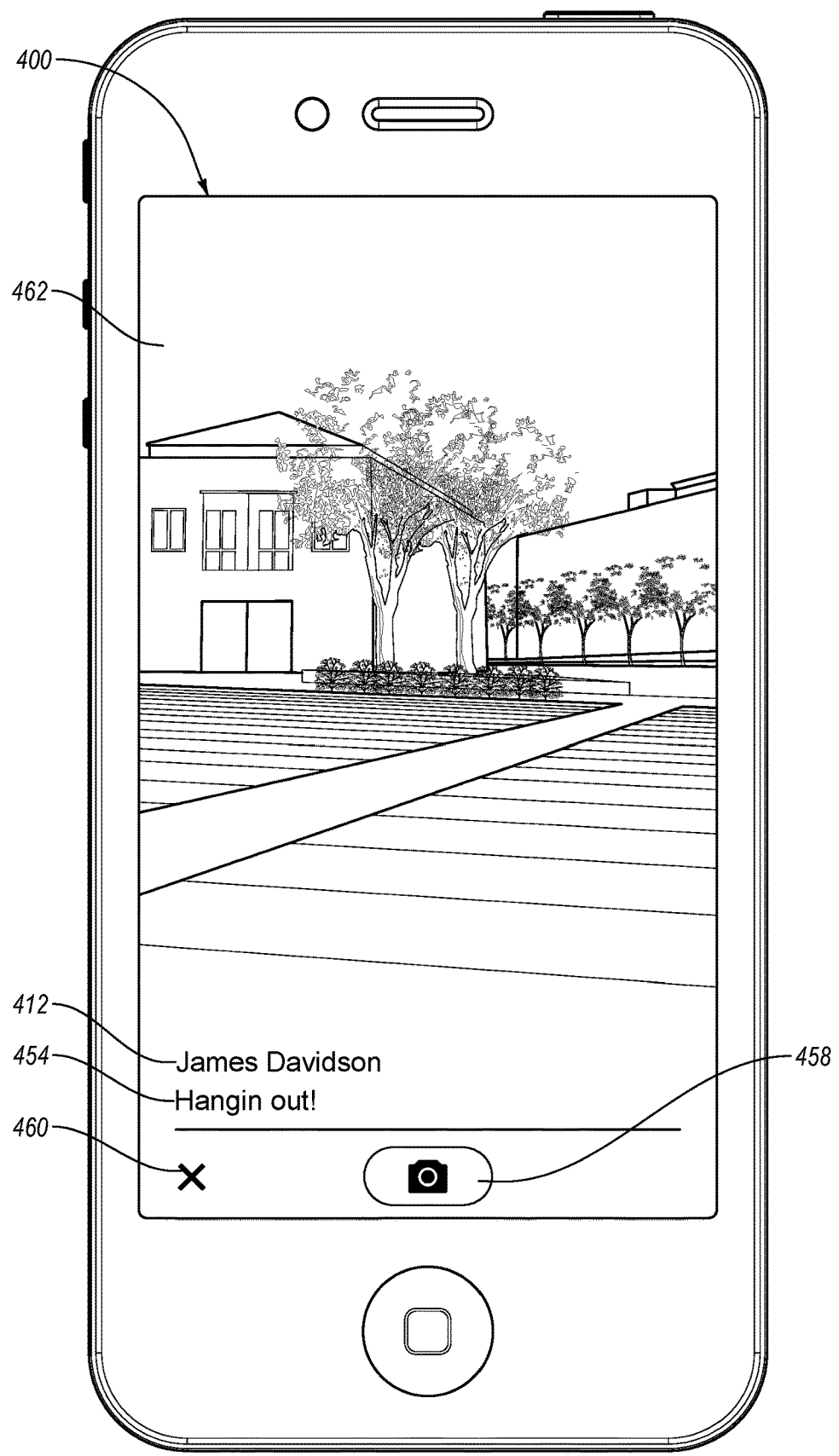

As mentioned above, one of the selectable modes included in the user interface 400 is a camera mode. FIGS. 8A-8B illustrate example interfaces and features of a camera mode 400 used to capture and insert a photograph into an electronic communication. In particular, FIG. 8A illustrates the user interface 400 in the text mode having the keyboard 416 located in the tray area 404, and the user graphic 412 located in the composition area 402. In addition, the composition area 402 can present a message 454 that the user has input using the keyboard 416. At this point in the process of composing an electronic communication, the user can interact with a camera element 456 located in the menu area 406. For example, the user can provide a tap gesture over the camera element 456.

Upon selecting the camera element 456, the user interface 400 can change to a camera mode, as illustrated in FIG. 8B. As illustrated in FIG. 8B, the camera mode can activate a camera viewfinder display 462 that presents a live or substantially live scene obtained from a camera lens located on the computing device. The viewfinder display 462 can be used to find the scene the user wishes to capture in a photograph.

In addition, the user interface 400 can include additional information within the viewfinder display 462. As illustrated in FIG. 8B, information from the user graphic 412 (e.g., the user name) can be overlaid the viewfinder display 462. Although FIG. 8B only illustrates the user name overlaid on the viewfinder display 462, other user or contact information can be overlaid, including a picture, phone number or other information. The user interface 400 can overlay additional content items in the viewfinder display 462. In particular, the message 454 can be overlaid the viewfinder display 462 as illustrated in FIG. 8B. In this way, the user can view various content items to be included in an electronic communication along with the scene of the soon to be captured photograph in the viewfinder display 462. As with contact and text content, image and places content can also be overlaid the viewfinder display 462 in a similar manner.

Once the user has found the scene in the viewfinder display 462 that the user desires to capture, the user can provide a tap gesture to a capture element 458 to capture the scene in a photograph. Upon capturing the photograph, the content items that were overlaid the viewfinder display 462 are associated with the captured photograph. The user can then send an electronic communication comprising the captured photograph and the overlaid content item information. In one example embodiment, upon the user interacting with the capture element 458 to capture the photograph, the electronic communication system associates the one or more content items with the captured photograph (e.g., as metadata associated with the photograph) and sends the electronic communication without additional input from the user.

If after previewing the captured photograph, the user does not want to send the electronic communication, the user can press a cancel element 460 to remove the captured photograph from the electronic communication. For example, the user can provide a tap gesture to the cancel element 460.

Although the process by which to associate content items with a captured photo is explained above in the order of first entering one or more content items, and then capturing the photograph, it is understood the user interface 400 can be used to first capture the photograph using the principles described herein, and then add content items using one or more additional modes of the user interface 400 to associate the content items with the captured photograph.

Figure 9:
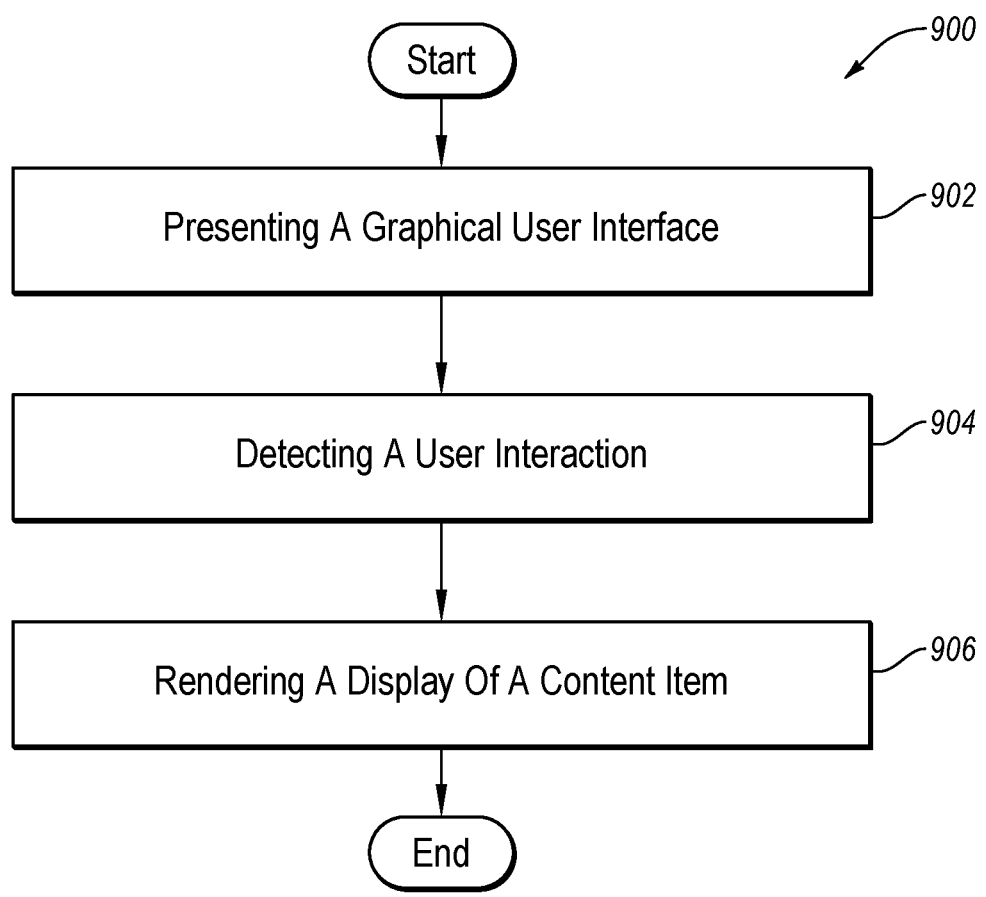
FIG. 9 illustrates an exemplary method of composing an electronic communication according to principles described herein.

FIG. 9 illustrates an exemplary method 900 of associating one or more content items with an electronic communication. While FIG. 9 illustrates exemplary steps according to one embodiment, other embodiments may omit, add to, reorder, and/or modify any of the steps shown in FIG. 9. One or more of the steps shown in FIG. 9 may be performed by any component or combination of components of system 200.

Step 902 may include presenting a graphical user interface. In particular, step 902 may include presenting a graphical user interface comprising a composition area for composing an electronic communication, and a tray area for selecting a content item. For example, system 200 can provide a user interface having a composition area and tray area as illustrated in FIGS. 4A-7D.

Step 904 may include detecting a user interaction. In particular, step 904 may include detecting, using at least one processor, a user interaction with a graphical element associated with the content item. For example, the user may provide a tap gesture, dragging gesture, or other gesture to the touch screen of the computing device with respect to a graphical element associated with a content item as illustrated in FIGS. 7A-7D.

Step 906 may include presenting a graphical user interface. In particular, step 906 may include, in response to the user interaction, presenting a display of the content item in the composition area. For example, upon the user providing a touch gesture to the touch screen over the graphic, the content item associated with the graphic can be presented in the composition area as illustrated in FIGS. 7A-7D.

Figure 10:
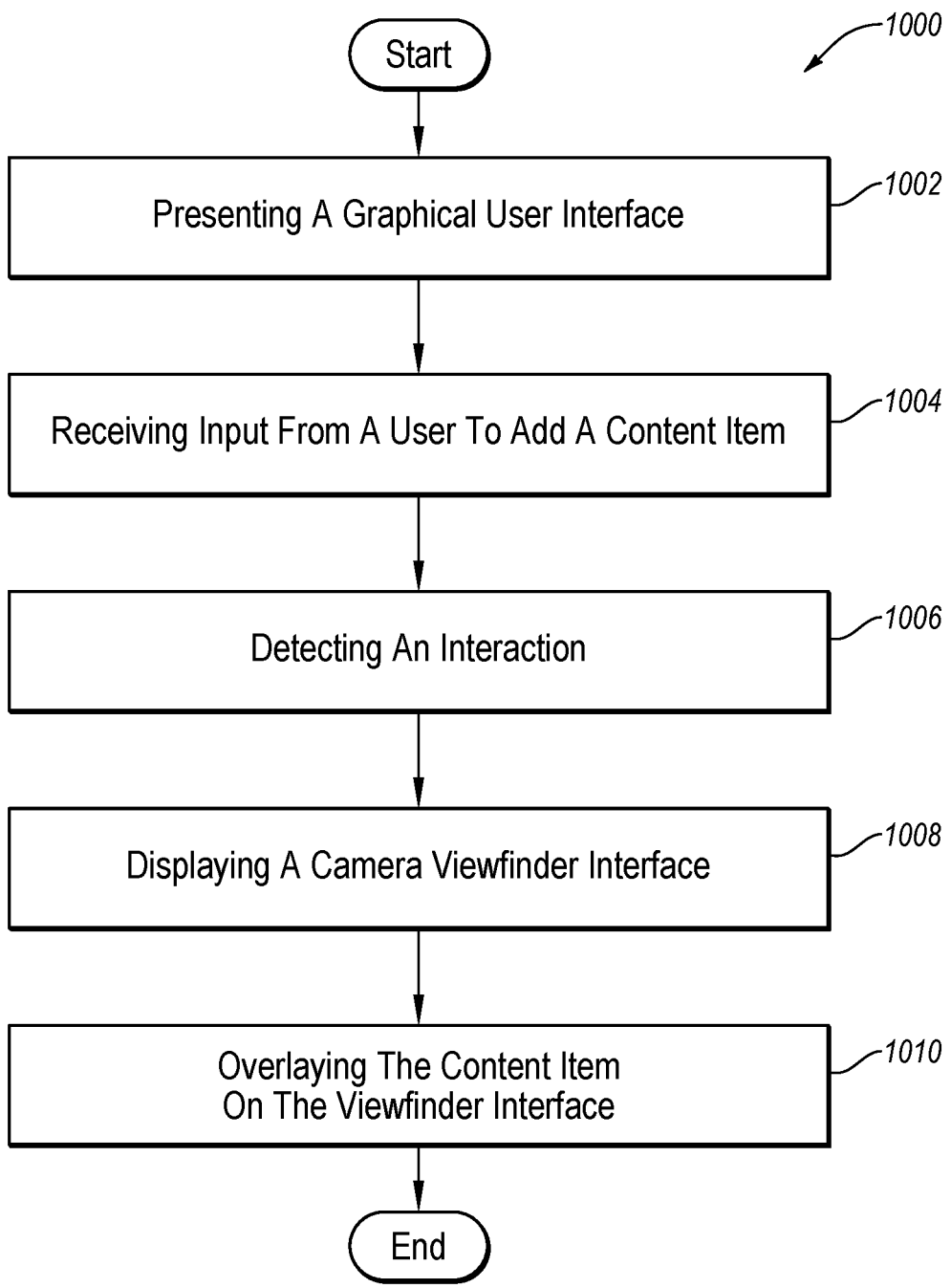
FIG. 10 illustrates another exemplary method of composing an electronic communication according to principles described herein.

FIG. 10 illustrates an exemplary method 1000 of associating content with a captured photograph. While FIG. 10 illustrates exemplary steps according to one embodiment, other embodiments may omit, add to, reorder, and/or modify any of the steps shown in FIG. 10. One or more of the steps shown in FIG. 10 may be performed by any component or combination of components of system 200.

Step 1002 may include presenting a graphical user interface. In particular, step 1002 may include presenting a graphical user interface that provides a composition area in which a user can add content items to an electronic communication. For example, system 200 can provide a user interface having a composition area and tray area as illustrated in FIGS. 4A-7D.

Step 1004 may include receiving input from a user to add a content item. In particular, step 1004 may include receiving input from a user, through the graphical user interface, to add one or more content items to the electronic communication. For example, the user can use one or more touch gestures to add one or more content items to the electronic communication as illustrated and explained with respect to FIGS. 7A-7D.

Step 1006 may include detecting an interaction. In particular, step 1006 may include detecting, using at least one processor, an interaction from the user. For example, computing device may detect an interaction with a camera element 456 as illustrated and explained with reference to FIGS. 8A-8B.

Step 1008 may include presenting a camera viewfinder interface. In particular, step 1008 may include, in response to the detected interaction, displaying a camera viewfinder interface, wherein the camera viewfinder interface displays a live scene from a camera. For example, upon the user providing a tap gesture to the camera element 456, the electronic communications interface 400 can change to a camera mode that provides a viewfinder display 462, as explained above with reference to FIGS. 8A-8B.

Step 1010 may include overlaying the content item on the viewfinder interface. In particular, step 1010 may include presenting a display of at least a portion of the one or more content items on the live scene from the camera. For example, the contact graphic information 412 and/or the message 454 can be overlaid the viewfinder display 462, as illustrated in FIG. 8B.

Figure 11:
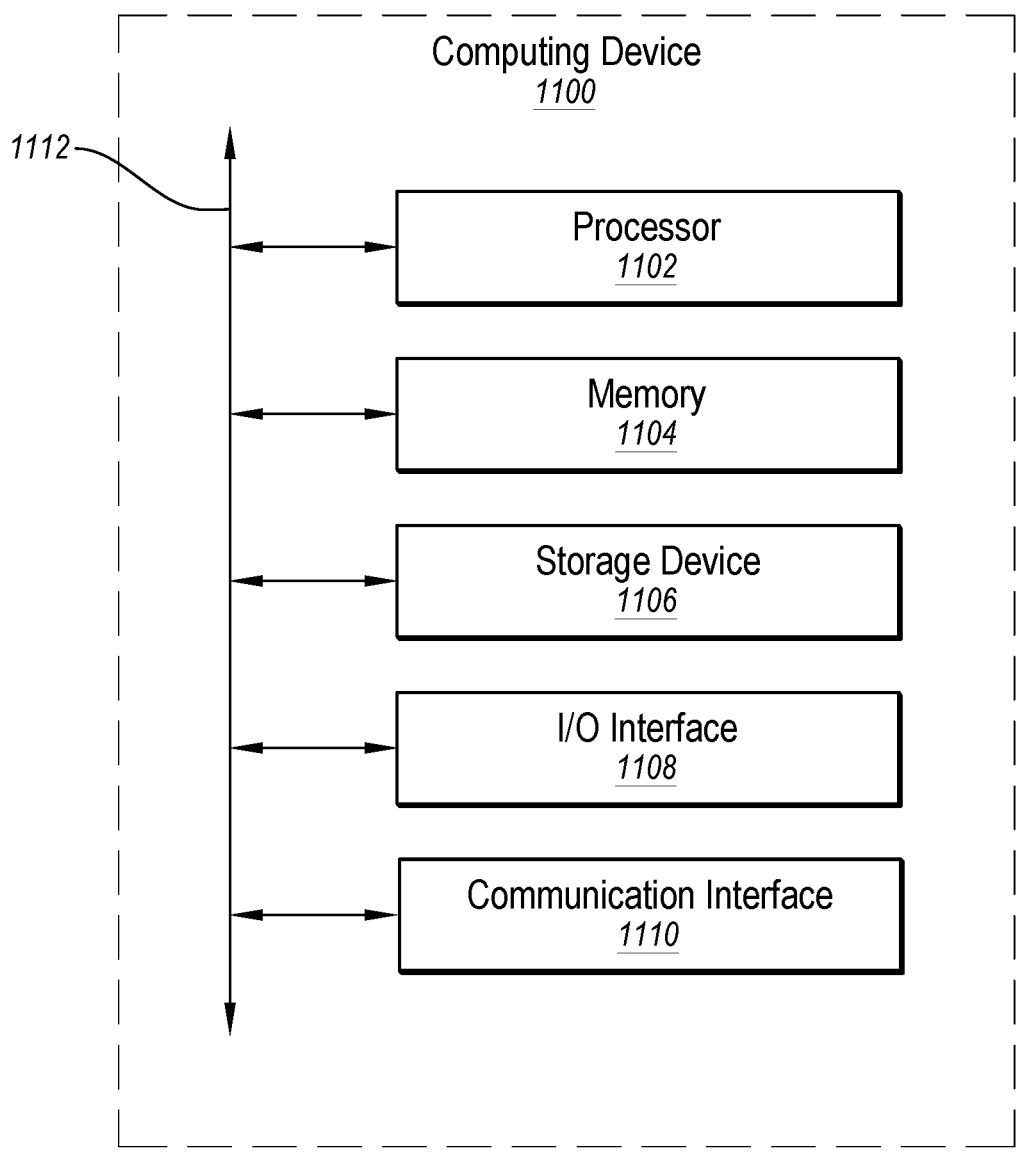
FIG. 11 illustrates a block diagram of an exemplary computing device according to principles described herein.

FIG. 11 illustrates, in block diagram form, an exemplary computing device 1100 that may be configured to perform one or more of the processes described above. One will appreciate that system 100, computing device 104, social-networking system 108, and/or system 200 each comprise one or more computing devices in accordance with implementations of computing device 1100. As shown by FIG. 11, the computing device can comprise a processor 1102, a memory 1104, a storage device 1106, an I/O interface 1108, and a communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other embodiments. Furthermore, in certain embodiments, a computing device 1100 can include fewer components than those shown in FIG. 11. Components of computing device 1100 shown in FIG. 11 will now be described in additional detail.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage device 1106 and decode and execute them. In particular embodiments, processor 1102 may include one or more internal caches for data, instructions, or addresses. As an example and not by way of limitation, processor 1102 may include one or more instruction caches, one or more data caches, and one or more translation lookaside buffers (TLBs). Instructions in the instruction caches may be copies of instructions in memory 1104 or storage 1106.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1104 may be internal or distributed memory.

Storage device 1106 includes storage for storing data or instructions. As an example and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to the computing device 1100. In particular embodiments, storage device 1106 is non-volatile, solid-state memory. In other embodiments, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to, receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, system 200 may be linked to and/or implemented within a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in to a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 12:
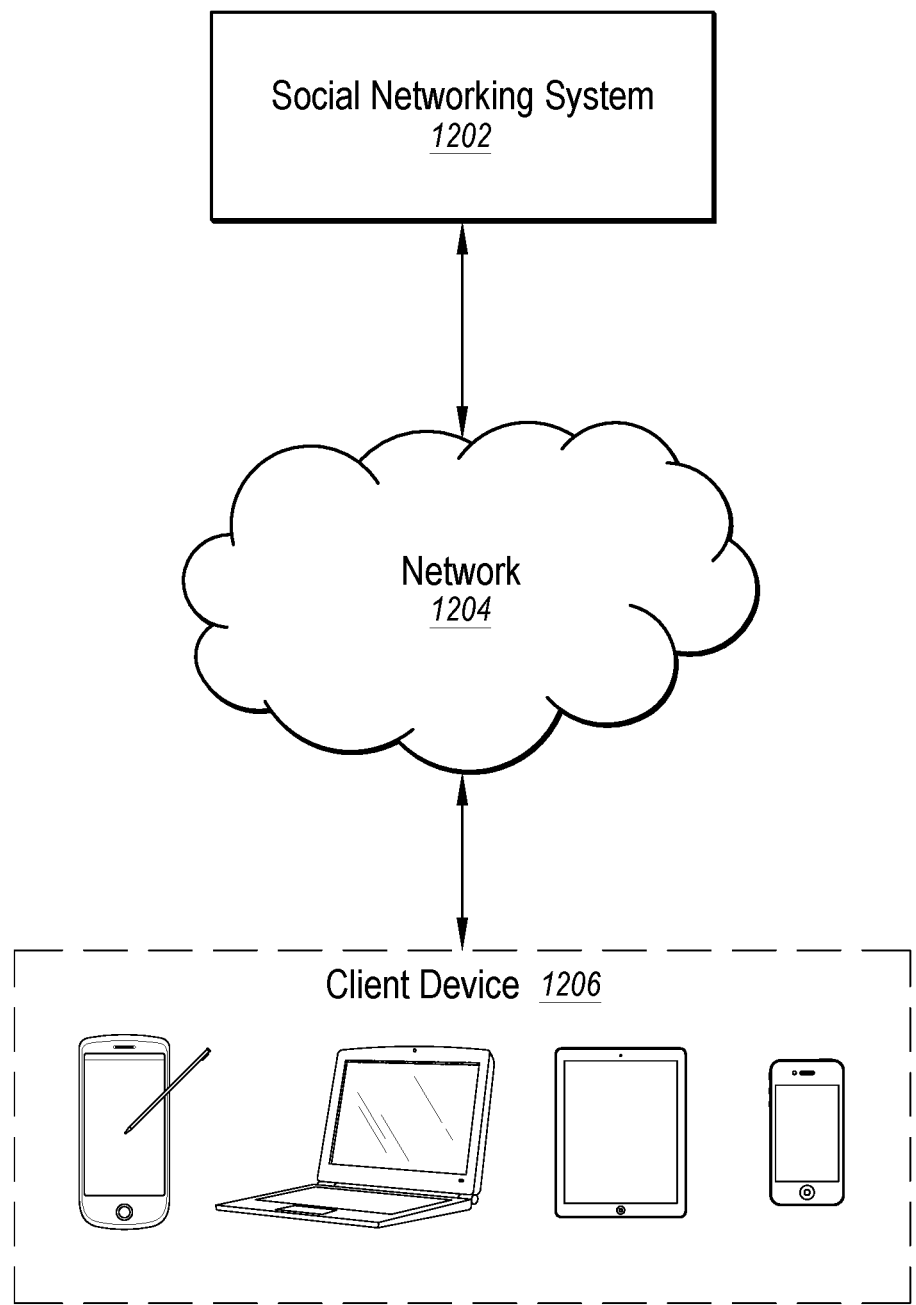
FIG. 12 illustrates an example network environment of a social-networking system according to principles described herein.

FIG. 12 illustrates an example network environment of a social-networking system. In particular embodiments, a social-networking system 1202 may comprise one or more data stores. In particular embodiments, the social-networking system 1202 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 1202 may comprise one or more computing devices (e.g., servers) hosting functionality directed to operation of the social-networking system 1202. A user of the social-networking system 1202 may access the social-networking system 1202 using a client device such as client device 1206. In particular embodiments, the client device 1206 can interact with the social-networking system 1202 through a network 1204.

The client device 1206 may be a desktop computer, a laptop computer, a tablet computer, a personal digital assistant (PDA), an in- or out-of-car navigation system, a smart phone or other cellular or mobile phone, or a mobile gaming device, other mobile device, or other suitable computing devices. Client device 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 1204.

Network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1206 may access the social-networking system 1202.

While these methods, systems, and user interfaces utilize both publicly available information as well as information provided by users of the social-networking system, all use of such information is to be explicitly subject to all privacy settings of the involved users and the privacy policy of the social-networking system as a whole.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:
1. A method comprising:
  display, on a client device, a graphical user interface comprising a composition interface to allow a user to compose electronic communications, the composition interface comprising a plurality of menu elements, the plurality of menu elements comprising at least two of:

a selectable camera element, a contact element, a location element, or an image element;

generating a user-generated content item in response to receiving user input via the composition interface of the graphical user interface, wherein the user input comprises at least one of: input indicating user-generated text, input indicating a user-selected location, or input indicating a user-selected contact;

based on detecting a first user interaction with the selectable camera element within the composition interface, switching from the composition interface to a camera viewfinder interface, wherein the camera viewfinder interface comprises:

a live scene from a camera on the client device; and an overlay portion overlaid the live scene and comprising the user-generated content item; and based on detecting a second user interaction with a capture element within the camera viewfinder interface, generating an electronic communication comprising a digital image of the live scene and the user-generated content item.

2. The method of claim 1, further comprising sending the electronic communication comprising the digital image and the user-generated content item to one or more client devices associated with one or more additional users.

3. The method of claim 2, wherein: the electronic communication is a social media post; and sending the electronic communication comprising the digital image and the user-generated content item comprises posting the social media post within a social networking system.

4. The method of claim 2, wherein capturing the digital image, generating the electronic communication with the digital image and the user-generated content item, and sending the electronic communication is performed in response to the second user interaction with the capture element within the camera viewfinder interface.

5. The method of claim 1, wherein generating the user-generated content item in response to receiving the user input comprises receiving one of: input indicating user-generated text, input indicating a user-selected location, or input indicating a user-selected contact.

6. The method of claim 1, wherein the composition interface further comprises a menu area comprising the selectable camera element and at least one of a contact element, a location element, or an image element.

7. The method of claim 6, further comprising:

detecting, within the menu area of the composition interface, a user selection of the image element; and providing, in response to the user selection of the image element, a navigable tray area within the composition interface, wherein the navigable tray area comprises a plurality of digital images through which the user can navigate within the navigable tray area.

8. The method of claim 7, further comprising:

detecting a swipe gesture within the navigable tray area; and scrolling the plurality of digital images in response to the swipe gesture within the navigable tray area.

9. The method of claim 8, further comprising:

detecting a tap gesture with respect to a digital image of the plurality of digital images; and in response to the tap gesture, adding the digital image to the electronic communication within the composition interface.

10. A mobile device, comprising: at least one processor; at least one non-transitory computer readable storage medium storing instructions thereon that, when executed by the at least one processor, cause the mobile device to:

display, on the mobile device, a graphical user interface comprising a composition interface to allow a user to compose electronic communications, the composition interface comprising a plurality of menu elements, the plurality of menu elements comprising at least two of: a selectable camera element, a contact element, a location element, or an image element;

generate a user-generated content item to in response to receiving user input via the composition interface of the graphical user interface, wherein the user input comprises at least one of: input indicating user-generated text, input indicating a user-selected location, or input indicating a user-selected contact;

based on detecting a first user interaction with the selectable camera element within the composition interface, switch from the composition interface to a camera viewfinder interface, wherein the camera viewfinder interface comprises:

a live scene from a camera on the mobile device; and an overlay portion overlaid the live scene and comprising the user-generated content item; and based on detecting a second user interaction with a capture element within the camera viewfinder interface, generate an electronic communication comprising a digital image of the live scene and the user-generated content item.

11. The mobile device of claim 10, further comprising instructions that, when executed by the at least one processor, cause the mobile device to send the electronic communication comprising the digital image and the user-generated content item to one or more client devices associated with one or more additional users.

12. The mobile device of claim 11, further comprising instructions that, when executed by the at least one processor, cause the mobile device to capture the digital image of the live scene, wherein capturing the digital image, generating the electronic communication with the digital image and the user-generated content item, and sending the electronic communication is performed in response to the second user interaction with the capture element within the camera viewfinder interface.

13. The mobile device of claim 10, wherein generating the user-generated content item in response to receiving the user input comprises receiving one of: input indicating user-generated text, input indicating a user-selected location, or input indicating a user-selected contact.

14. The mobile device of claim 10, wherein the composition interface further comprises a menu area comprising the selectable camera element and at least one of a contact element, a location element, or an image element.

15. The mobile device of claim 14, further comprising instructions that, when executed by the at least one processor, cause the mobile device to:

detect, within the menu area of the composition interface, a user selection of the image element; and provide, in response to the user selection of the image element, a navigable tray area within the composition interface, wherein the navigable tray area comprises a plurality of digital images through which the user can navigate within the navigable tray area.

16. A non-transitory computer readable storage medium storing instructions that, when executed by at least one processor, cause a mobile device to:

display, on the mobile device, a graphical user interface comprising a composition interface to allow a user to compose electronic communications, the composition interface comprising a plurality of menu elements, the plurality of menu elements comprising at least two of: a selectable camera element, a contact element, a location element, or an image element;

generate a user-generated content item to in response to receiving user input via the composition interface of the graphical user interface, wherein the user input comprises at least one of: input indicating user-generated text, input indicating a user-selected location, or input indicating a user-selected contact;

based on detecting a first user interaction with the selectable camera element within the composition interface, switch from the composition interface to a camera viewfinder interface, wherein the camera viewfinder interface comprises:
 a live scene from a camera on the mobile device; and
 an overlay portion overlaid the live scene and comprising the user-generated content item; and based on detecting a second user interaction with a capture element within the camera viewfinder interface, generate an electronic communication comprising a digital image of the live scene and the user-generated content item.

17. The non-transitory computer readable storage medium of claim 16, further comprising instructions that, when executed by the at least one processor, cause the computer device to send the electronic communication comprising the digital image and the user-generated content item to one or more client devices associated with one or more additional users.

18. The non-transitory computer readable storage medium of claim 17, further comprising instructions that, when executed by the at least one processor, cause the computer device to capture the digital image of the live scene, wherein capturing the digital image, generating the electronic communication with the digital image and the user-generated content item, and sending the electronic communication is performed in response to the second user interaction with the capture element within the camera viewfinder interface.

19. The non-transitory computer readable storage medium of claim 16, wherein the composition interface further comprises a menu area comprising the selectable camera element and at least one of a contact element, a location element, or an image element.

20. The non-transitory computer readable storage medium of claim 19, further comprising instructions that, when executed by the at least one processor, cause the computer device to:
 detect, within the menu area of the composition interface, a user selection of the image element; and
 provide, in response to the user selection of the image element, a navigable tray area within the composition interface, wherein the navigable tray area comprises a plurality of digital images through which the user can navigate within the navigable tray area.

* * * * *